United States Patent [19]

Sato et al.

[11] Patent Number: 5,475,656
[45] Date of Patent: * Dec. 12, 1995

[54] OPTICAL DISK MEMORY AND INFORMATION PROCESSING APPARATUS

[75] Inventors: Yoshio Sato, Hitachi; Nobuyoshi Tsuboi, Ibaraki; Hiroyuki Minemura, Hitachi; Hisashi Andoh, Hitachi; Masaichi Nagai, Hitachi; Isao Ikuta, Iwaki; Yoshimi Kato, Takahagi; Yoshihito Maeda, Mito; Tatsuya Sugita, Hitachi; Yutaka Sugita, Tokorozawa, all of Japan

[73] Assignee: Hitachi, Ltd., Tokyo, Japan

[*] Notice: The portion of the term of this patent subsequent to Dec. 28, 2010, has been disclaimed.

[21] Appl. No.: 755,179

[22] Filed: Sep. 5, 1991

Related U.S. Application Data

[63] Continuation-in-part of Ser. No. 584,079, Sep. 18, 1990, abandoned.

[30] Foreign Application Priority Data

Sep. 27, 1989 [JP] Japan .................................. 1-249154
Dec. 6, 1989 [JP] Japan .................................. 1-315289
Jan. 30, 1991 [JP] Japan .................................. 3-010252

[51] Int. Cl.⁶ ..................................................... G11B 7/00
[52] U.S. Cl. ............................... 369/13; 369/14; 369/273
[58] Field of Search ................................ 369/13, 14, 15, 369/273, 275.2, 275.5; 360/59, 114; 365/122

[56] References Cited

U.S. PATENT DOCUMENTS

| | | | |
|---|---|---|---|
| 4,592,042 | 5/1986 | Lemelson et al. | 369/258 |
| 4,868,373 | 9/1989 | Opheij et al. | 369/14 |
| 5,117,415 | 5/1992 | Ohta et al. | 369/275.3 |
| 5,218,599 | 6/1993 | Tsuyoshi et al. | 360/2 |
| 5,317,556 | 5/1994 | Tsuboi et al. | 369/13 |

FOREIGN PATENT DOCUMENTS

| | | |
|---|---|---|
| 116936 | 8/1984 | European Pat. Off. . |
| 130364 | 1/1985 | European Pat. Off. . |
| 275657 | 7/1988 | European Pat. Off. . |
| 292309 | 11/1988 | European Pat. Off. . |
| 8800733 | 10/1989 | European Pat. Off. . |
| 60-079581 | 5/1985 | Japan . |
| 63-268145 | 11/1988 | Japan . |

OTHER PUBLICATIONS

Wheeler J. W. "Web-based optical disk assemblies," proceeding of SPIE, pp. 39–52, vol. 420, 1983.
Uber, R. E. and M. H. Kryder, "Prototype Magneto-Optical Disk Drive," *Proceedings of SPIE*, pp. 34–38, vol. 899, 1988.

*Primary Examiner*—Georgia Y. Epps
*Assistant Examiner*—Tan Dinh
*Attorney, Agent, or Firm*—Antonelli, Terry, Stout & Kraus

[57] ABSTRACT

The information processor uses a portable memory formed on a transparent substrate which is able to be overwritten by laser power modulation system. The memory includes a disk type recording medium rotatably incorporated within a thin case, and carries out write/read/erase by means of a first magnetic field application device, a second magnetic field application device, and an optical head radiating light through the case which has at least a transparent light-incident portion. The case includes therein a rotation means for rotating the recording medium within the case, thereby enabling even further reduction in size of the information processor.

23 Claims, 30 Drawing Sheets

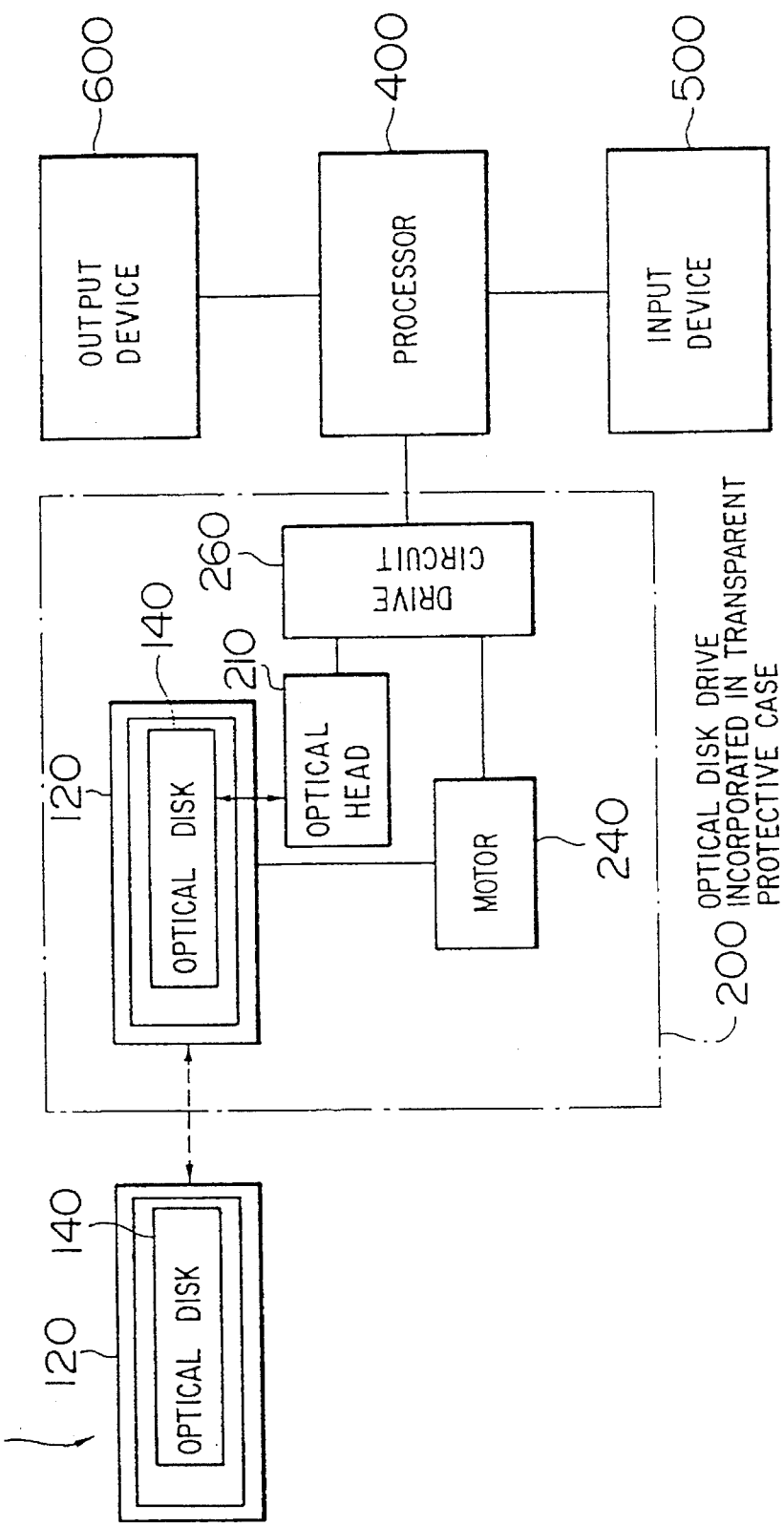

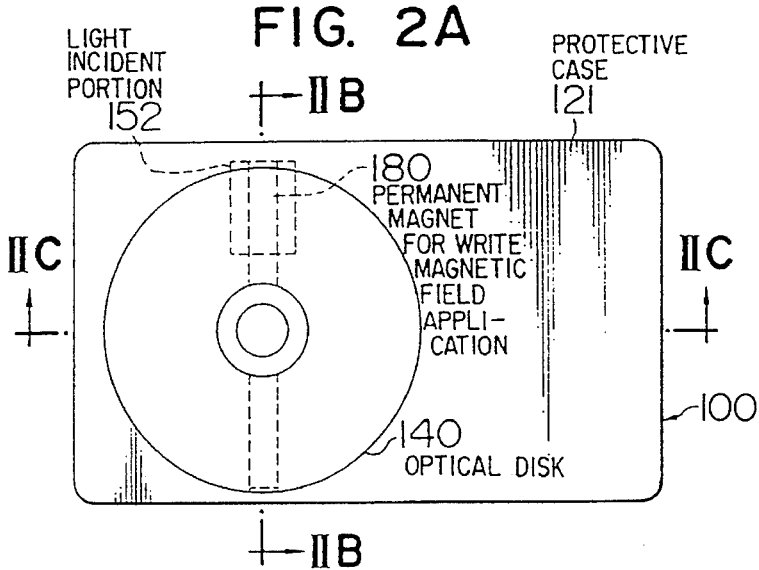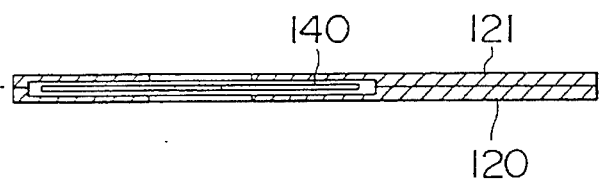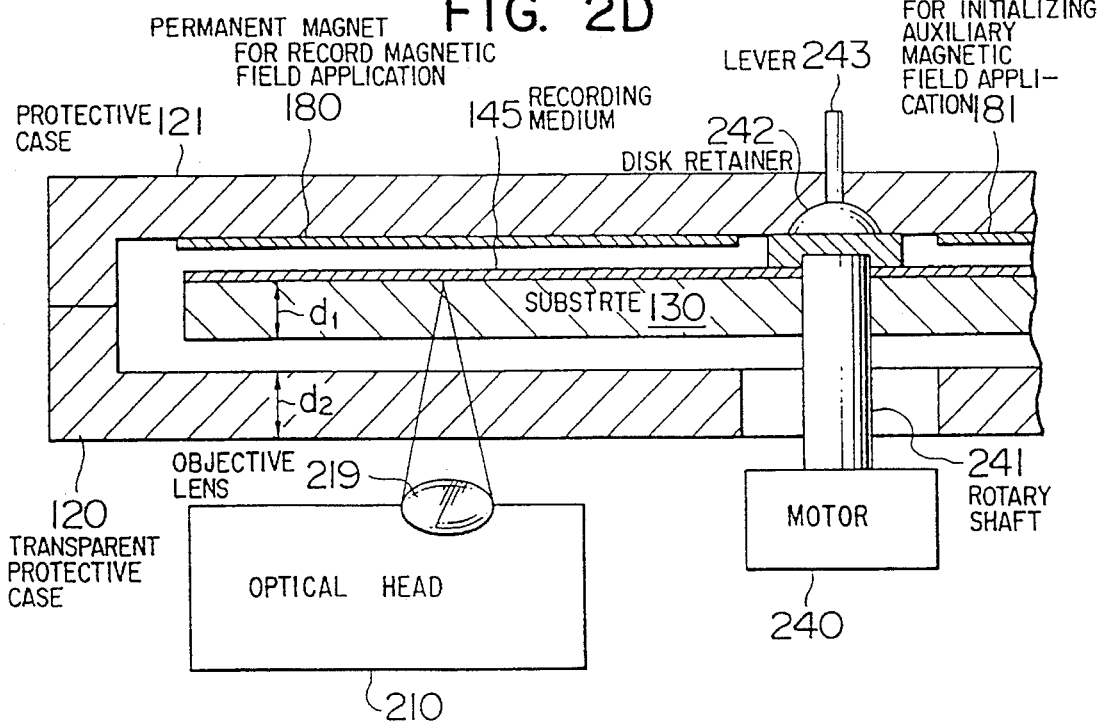

PRINCIPLES OF WRITE / READ / ERASE OF PHASE-CHANGE OPTICAL DISK

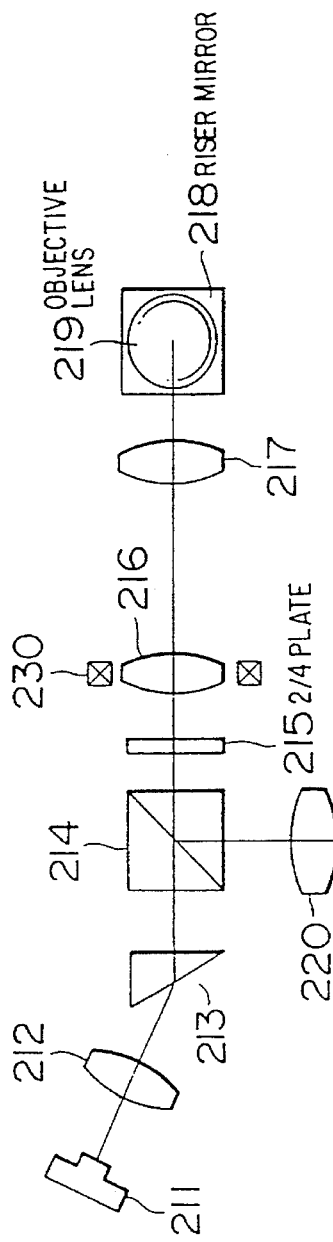
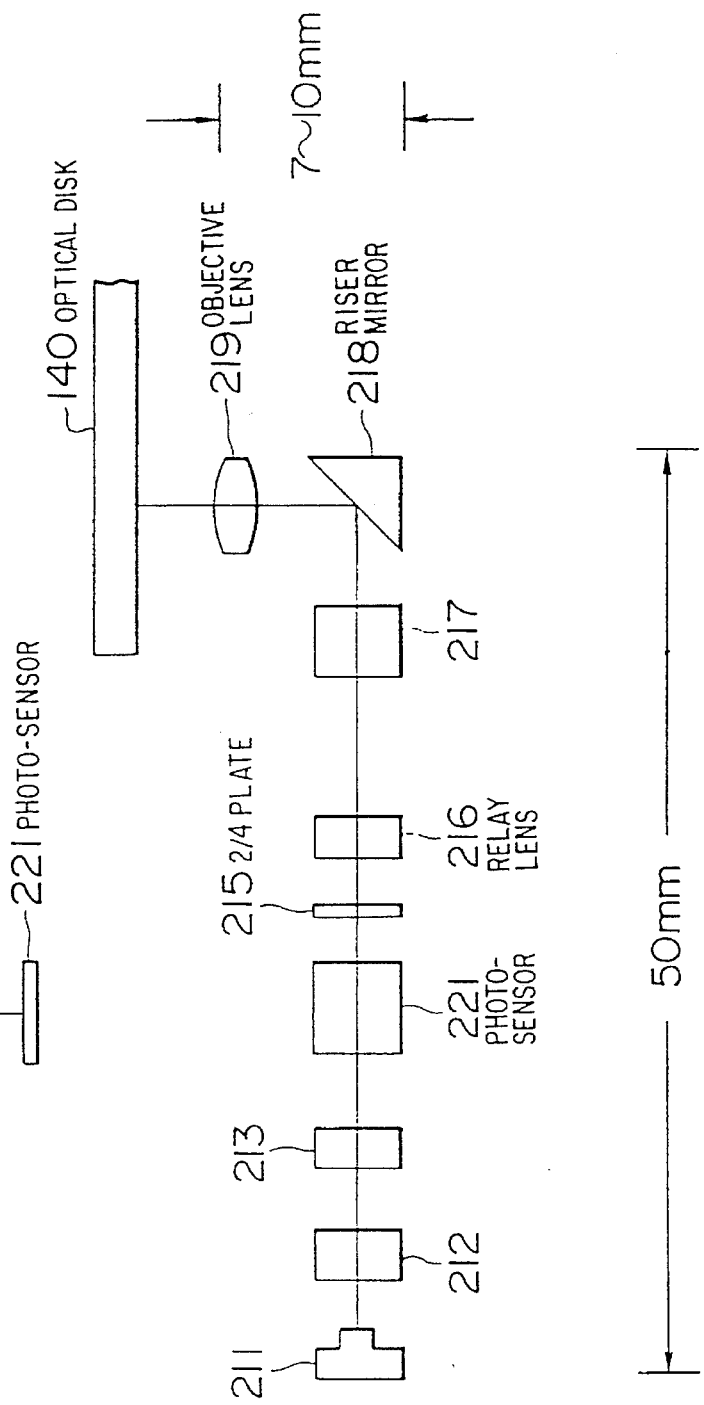
FIG. 14A
FIG. 14B (ENLARGED VIEW OF PORTION F)

(ENLARGED VIEW OF PORTION G)

XXIIIB-XXIIIB
SECTIONAL VIEW

FIG. 25
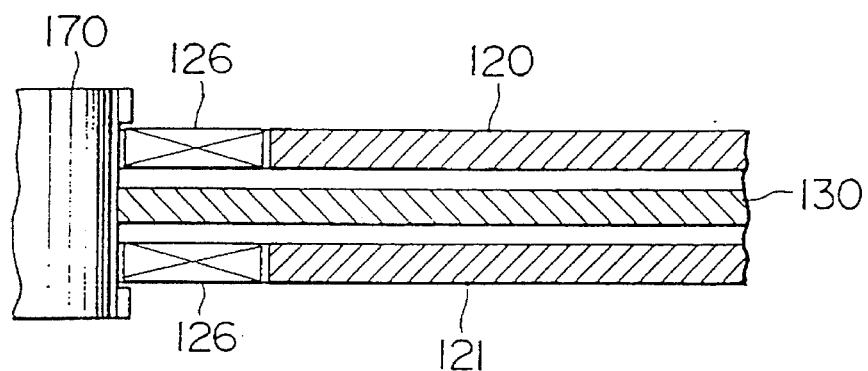
FIG. 26B   FIG. 26A   FIG. 26D
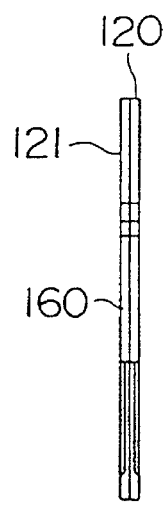 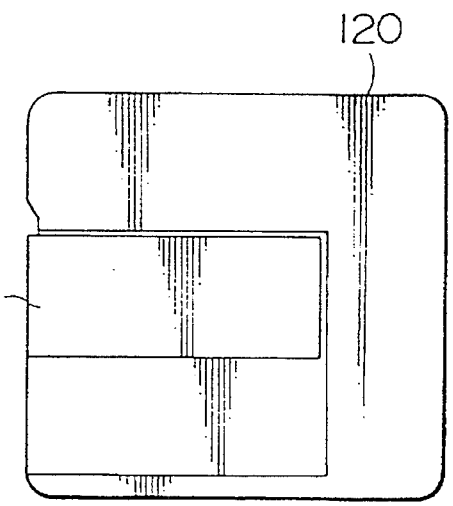 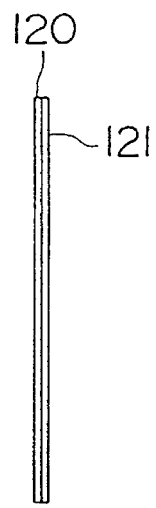
FIG. 26C
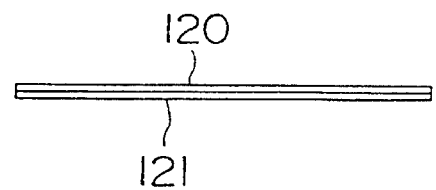

FIG. 27
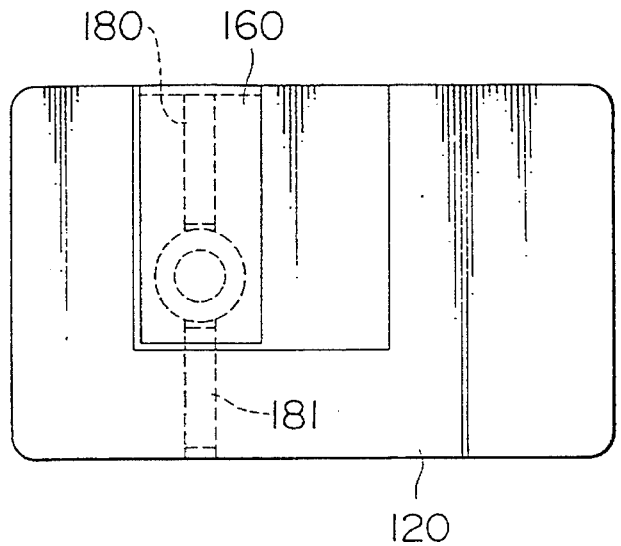
FIG. 28B    FIG. 28A
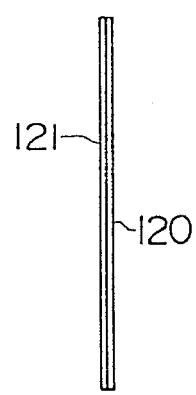 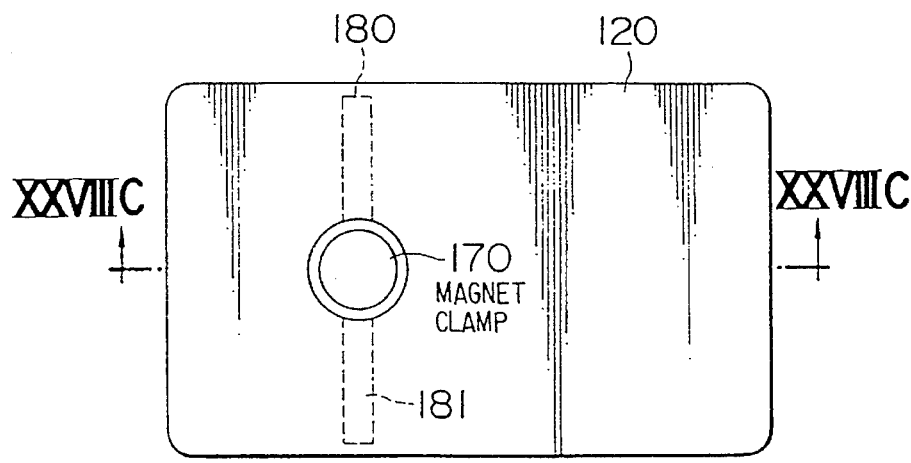
FIG. 28C
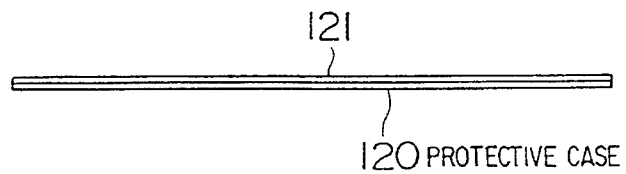

(ENLARGED VIEW OF PORTION K)

(ENLARGED VIEW OF PORTION L)

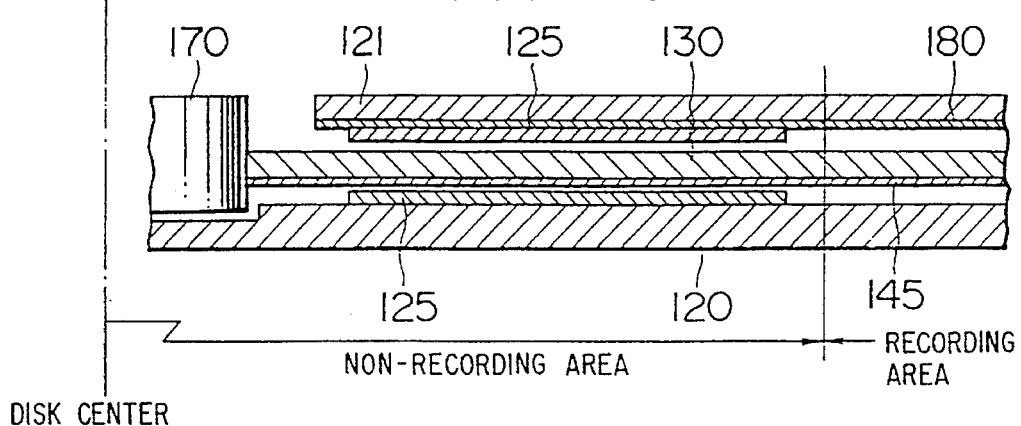
FIG. 30
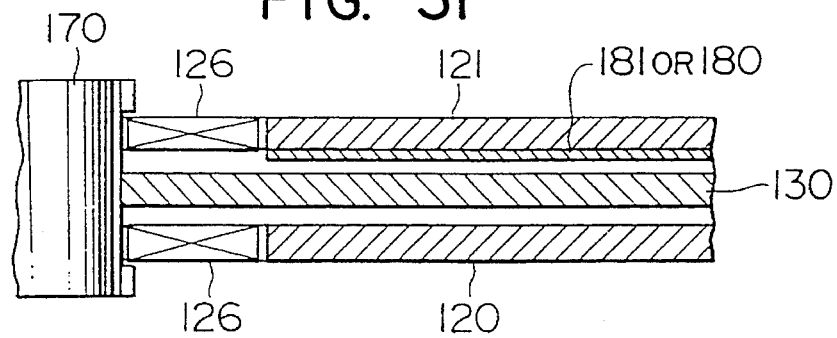
FIG. 31
FIG. 32B  FIG. 32A  FIG. 32D
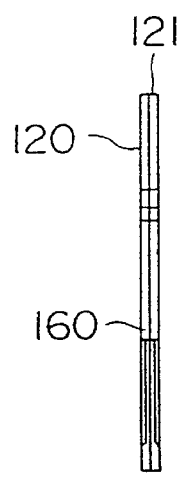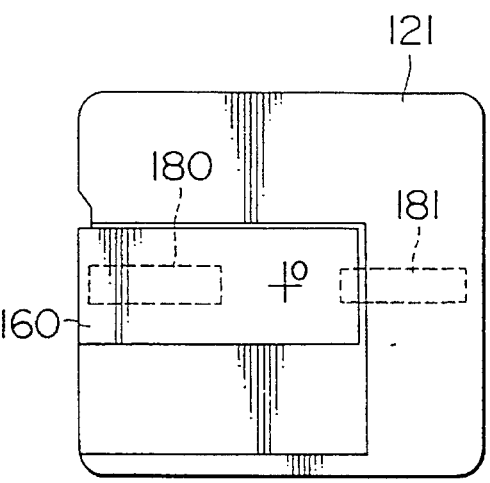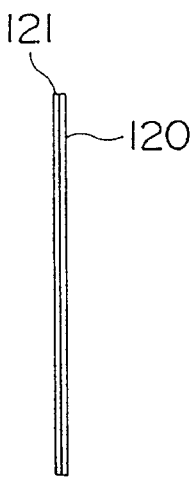
FIG. 32C
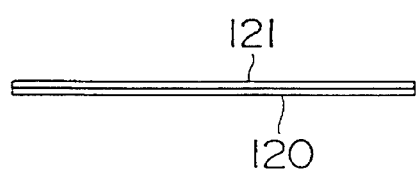

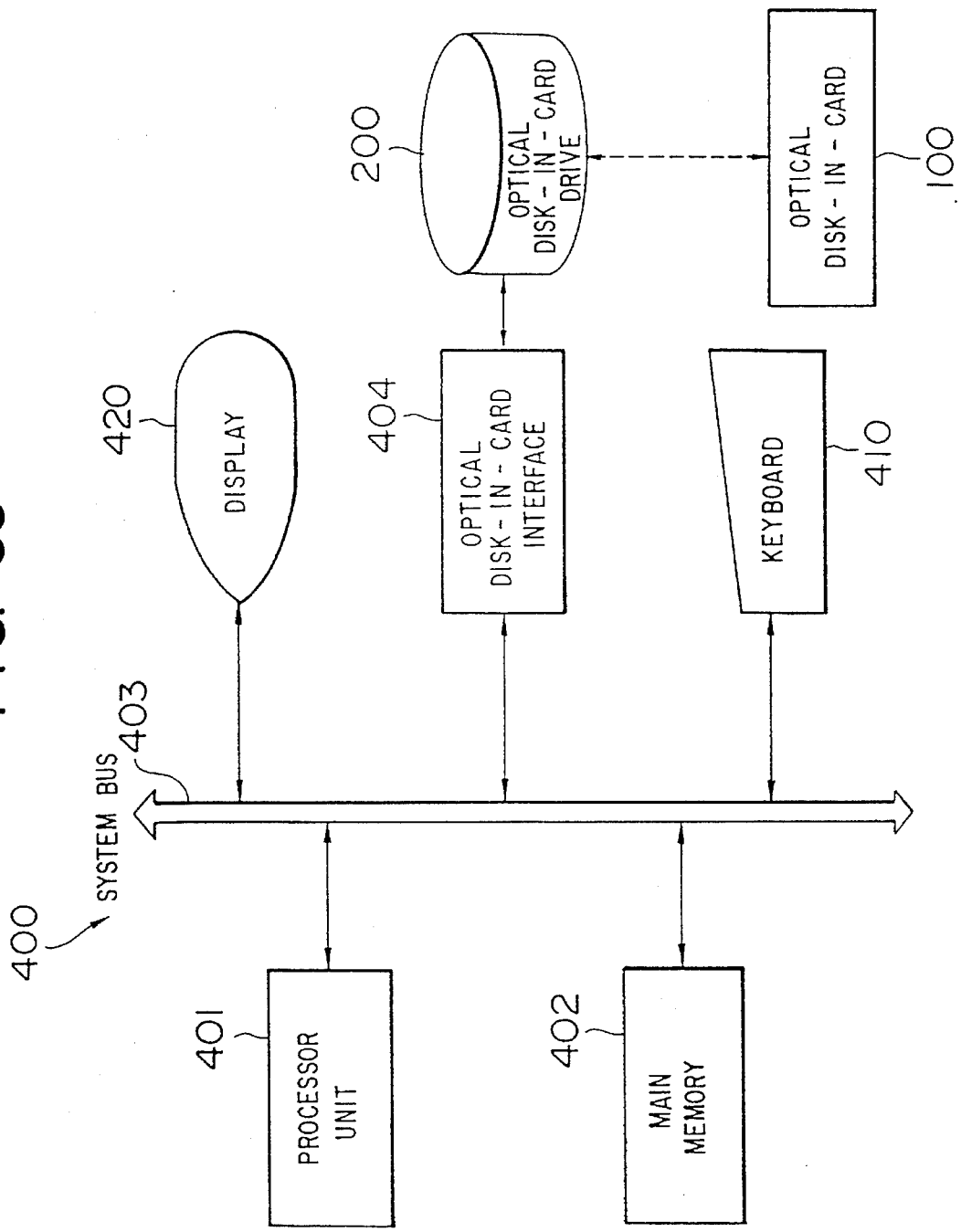

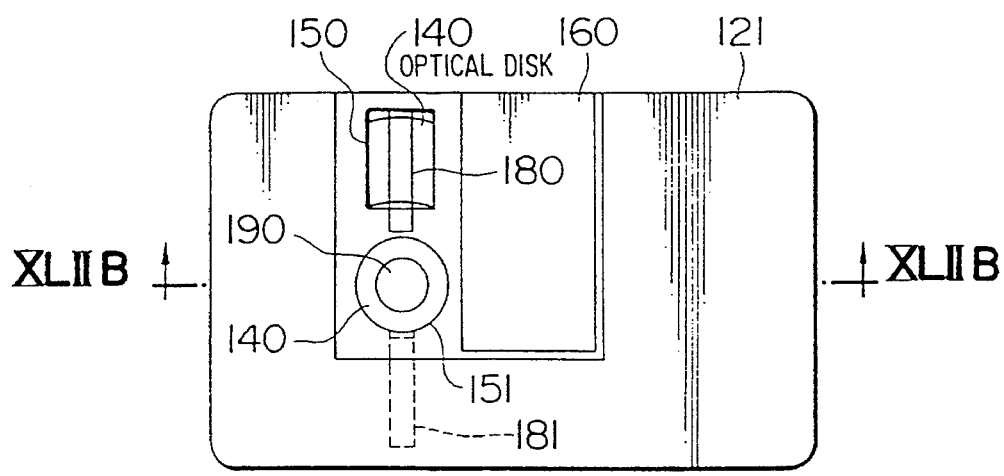
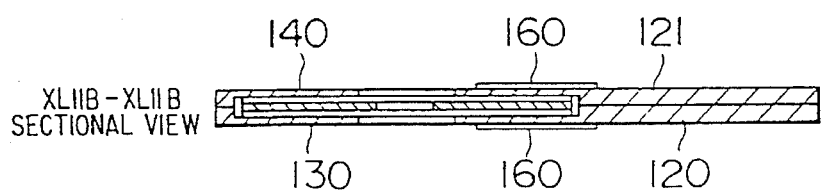
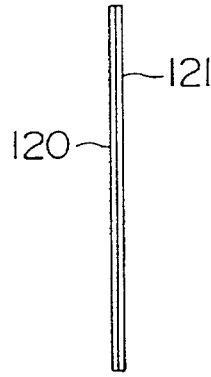
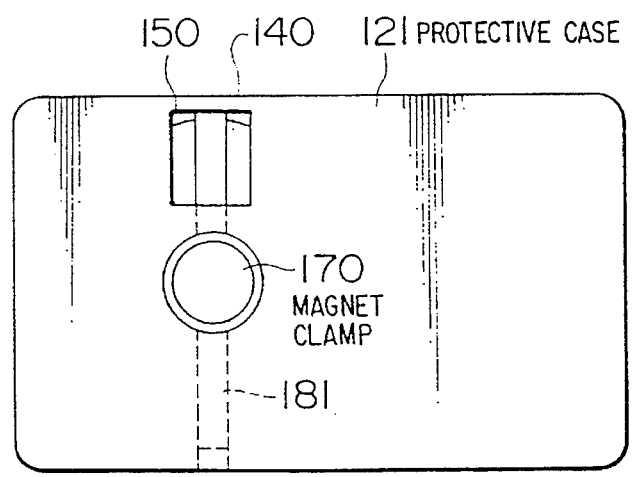
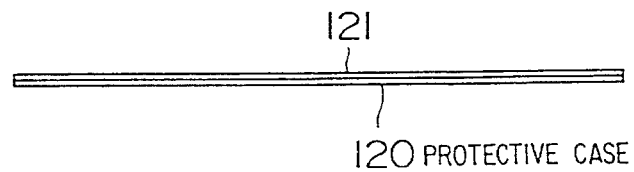

OPTICAL DISK MEMORY AND INFORMATION PROCESSING APPARATUS

CROSS-REFERENCES TO THE RELATED APPLICATION

This application is a continuation-in-part of U.S. patent application Ser. No. 07/584079, filed Sep. 18, 1990, abandoned, Canadian Patent Application No. 2025724, Australian Patent Application No. 63015/90, Chinese Patent Application No. 90108048 and European Patent Application No. 90118321.0, entitled "Information Processor and Disk Memory used in the Same" filed by Yoshio SATO, Nobuyoshi TSUBOI, Hiroyuki MINEMURA, Hisashi ANDOH, Masaichi NAGAI, Isao IKUTA, Yoshimi KATO, Yoshihito MAEDA, Tatsuya SUGITA and Yutaka SUGITA on Sep. 18, 1990 and assigned by the present assignee, based on Japanese Patent Application No. 01-249154 filed September, 1989 and Japanese Patent Application No. 01-315289 filed Dec. 6, 1989 both in JAPAN, both disclosure of which are incorporated by reference in this application.

BACKGROUND OF THE INVENTION

The present invention relates to an information processor using a disk memory having a disk for use in a portable recording medium capable of reading, writing, erasing, and/or overwriting in a thin rectangular card and a disk memory used therein.

A card which performs read/write of information while rotating a recording medium such as an optical disk and a floppy disk using a tellurium alloy in a flat space is described in JP-A-60-79581.

A magneto-optical disk memory device capable of overwriting by laser power modulation is described in JP-A-62-175948, but a permanent magnet for initializing a magneto-optical disk and a permanent magnet for writing are fixed to an optical disk memory device, and furthermore, an optical head is positioned on an opposite side to the magneto-optical disk. Moreover, in the magneto-optical disk, such a method is adopted that an optical disk medium is fixedly adhered onto a substrate having a thickness of approximately 1.2 mm so as to have light incident from the substrate side as a countermeasure against dust attaching thereto, and the optical disk is contained in a protective case for transportation, thus, requiring a thickness of 6 to 10 mm as the whole optical disk. Because the substrate requires a thickness of 1.2 mm and the permanent magnet for initialization and the permanent magnet for recording are fixed on the opposite side with respect to the optical head and the optical disk in a conventional magneto-optical disk as described above, the thickness of this permanent magnet portion is significant, thus not only making it difficult to miniaturize the optical disk, in particular to form it in a credit card ordered size, but also inhibiting formation of a thin optical disk memory device.

On the other hand, an example in which a disk magneto-optical medium capable of overwriting on a glass substrate having a thickness of 1.2 mm is incorporated in a cartridge, a permanent magnet for application of initializing auxiliary magnetic field is incorporated in the cartridge, and a permanent magnet for recording is installed in a recording device is disclosed in JP-A-64-46247. However, it is difficult to miniaturize and reduce the thickness of an optical disk, in particular to form it in a credit card ordered size when the cartridge is included because a thickness of 1.2 mm is required for the substrate. Further, since the permanent magnet for recording is fixed on the opposite side with respect to the optical head and the optical disk, the thickness of this permanent magnet portion is increased, and thus, there are limitations to making the optical disk memory device thinner. Moreover, there is also such a problem that the laser portion of the optical disk is liable to be damaged because the optical disk is exposed when the window of the cartridge cover is opened.

When a disk capable of reading, writing, erasing, and/or overwriting by a laser power modulation is used as a memory for a lap top computer or other portable information processors, it is desirable to be rectangular in configuration and to be in a card form or a sheet form, in terms of thickness, which is provided with a protective case, for the sake of portability. In a conventional optical disk, however, because the substrate requires a thickness of 1.2 mm as a countermeasure against sticking disk, and particularly in the case of magneto-optical recording, the permanent magnet for initialization and the permanent magnet for recording are fixed on the opposite side of the optical disk with respect to the optical head. Thus, the thickness of this permanent magnet portion is increased, which limits formation of a thin film, and it has been impossible to use such a conventional optical disk in a lap rod computer and a portable optical disk memory device.

As an example for reducing the thickness, a flexible optical disk and a stabilizing plate formed of a translucent material with at least a part thereof being pervious to light are provided as disclosed in JP-A-64-30087. In the case of this optical disk, a disk substrate having the thickness of 1.2 mm as described above is not used. Therefore, the optical disk itself may be formed in a very thin form.

In this case, however, there is no provision in the disk itself at all for removing dust that enters into the case for rotating the optical disk through a hub hole. Thus, such a problem arises that the optical disk is damaged or write/read become impossible with those parts that are covered with dust.

An enclosed type disk has an advantage of not being influenced by foreign dust as compared with a non-enclosed type disk. However, it cannot be avoided that dust generated in a production process will enter into the case, even if the recording medium is totally enclosed. Further, it may happen that dust is generated by friction and the like at a drive portion for rotating the disk. Such dust remains in the case since the space in the case is closed. Thus, it may happen that the dust moves in the case and sticks to a recording area of the disk. As a result, troubles in write/read of information may occur as described above.

SUMMARY OF THE INVENTION

It is an object of the present invention to provide an information processor using a disk memory card (hereafter abbreviated as "disk-in-card") including an optical disk using a portable recording medium capable of reading, writing, erasing, and/or overwriting by a highly reliable laser power modulation system in a thin rectangular case, particularly in a card or a sheet and a disk memory used therein.

In order to achieve the above-described object, the present invention has omitted the transparent substrate of 1.2 mm in thickness which has been heretofore used as a substrate for an optical disk in the prior art, and includes a transparent opaque case, and light from write/read/erase is made incident through the transparent case, thereby reducing the thickness of the whole optical disk, including the case.

Furthermore, in order to achieve above-described object, according to the present invention, an optical disk is contained in a case of a credit card ordered size which is convenient for transportation, thus realizing a memory of a large capacity which could not be materialized with a conventional memory for a lap top computer.

The present invention has a feature in that an optical disk is contained in a card-sized case, thereby to providing a device which is convenient for transportation and which prevents dust from sticking to the optical disk, and a memory of a large capacity of more than 50 MB, which is impossible with a conventional card-sized memory, realized.

In order to achieve the above-described object, according to the present invention, there is provided an information processor comprising:

an optical disk contained in a thin case including an optical disk recording medium formed on a transparent substrate for recording, reproducing or overwriting information based on optical modulation, a thin case for supporting the optical disk recording medium rotatably, at least a light incident portion thereof being transparent, and dust protective means for forcibly prohibiting dust from entering from a rotating portion thereof;

an optical head for recording required information in the optical recording medium, or reproducing information already recorded therein, or overwriting information already recorded;

rotation device for rotating the optical disk recording medium;

a drive circuit for controlling operation of the optical head and rotation speed of the rotation device;

a processor for giving an instruction to the drive circuit;

input device for inputting information to the processor; and output device for outputting information from the processor.

Further, an information processor of the present invention comprises:

an optical disk contained in a thin case including an optical disk recording medium formed on a transparent substrate for recording, reproducing or overwriting information based on the optical modulation, and a thin case for supporting the optical disk recording medium rotatably, at least a light incident portion thereof being transparent, and in which total thickness of the transparent substrate and the case at the light incident portion is 0.25 to 1.2 mm;

an optical head for recording required information in the optical recording medium, or reproducing information already recorded therein, or overwriting information already recorded;

rotation device for rotating the optical disk recording medium;

a drive circuit for controlling operation of the optical head and rotation speed of the rotation device;

a processor for giving an instruction to the drive circuit;

input device for inputting information to the processor; and output device for outputting information from the processor.

Furthermore, an information processor of the present invention comprises:

a magneto-optical disk contained in a thin case including a magneto-optical disk recording medium having a recording layer and an auxiliary recording layer formed on a transparent substrate for recording, reproducing or overwriting information based on optical modulation, a thin case for supporting the magneto-optical disk recording medium rotatably, at least a light incident portion of which being transparent, magnetic field application device for initializing the auxiliary recording layer and magnetic field application device for recording information in the recording layer provided in the case, in which the total thickness of the transparent substrate and the case at the light incident portion is 0.25 to 1.2 mm;

an optical head for recording required information in the magneto-optical disk recording medium, or reproducing information already recorded, or carrying out both;

rotation device for rotating the magneto-optical disk recording medium;

a drive circuit for controlling operation of the optical head and rotation speed of the rotation device;

a processor for giving an instruction to the drive circuit;

input device for inputting information to the processor; and output device for outputting information from the processor.

Furthermore, an information processor of the present invention comprises:

a magneto-optical disk-in-card in which a rotatable disk magneto-optical disk recording medium composed of at least two layers, a recording layer and an auxiliary recording layer formed on a transparent substrate for recording, reproducing or overwriting information based on the optical modulation is contained inside a card case as being of a credit card size having a transparent portion, a magnetic field application device for initializing the auxiliary recording layer and magnetic field application means for recording information in the recording layer are incorporated in the card case and the total thickness of the transparent substrate and the case at the transparent portion is 0.25 to 1.2 mm;

an optical head for reproducing at least information recorded in the magneto-optical recording medium;

rotation device for rotating the magneto-optical recording medium;

a drive circuit for controlling operation of the optical head and rotation speed of the rotation device;

a processor for giving an instruction to the drive circuit;

input device for inputting information to the processor; and output device for outputting information from the processor.

Furthermore, an information processor of the present invention comprises:

a magneto-optical disk-in-card in which a rotatable disk magneto-optical disk recording medium composed of at least two layers, a recording layer and an auxiliary recording layer formed on a transparent substrate for recording, reproducing or overwriting information based on the optical modulation is contained inside a card case as being of a credit card size, at least a light incident portion of which being transparent, magnetic field application device for initializing the auxiliary recording layer and magnetic field application device for recording information in the recording layer are incorporated in the card case, and the total thickness of the transparent substrate and the case at the light incident portion is 0.25 to 1.2 mm and rotation device for rotating the magneto-optical recording medium is incorporated therein;

an optical head for reproducing at least information recorded in the magneto-optical recording medium;

a drive circuit for controlling operation of the optical head and rotation speed of the rotation device;

a processor for giving an instruction to the drive circuit;

input device for inputting information to the processor; and output device for outputting information from the processor.

Here, the thickness of 0.25 mm is the minimum value of the total thickness of the transparent substrate and the case at the light incident portion. However, 0.05 mm is the limit in terms of strength and manufacturing, and 0.2 mm is the limit in terms of strength of the case. Thus, the maximum value is deemed to be at 0.25 mm.

In the disk memory of the present invention, a thin case in which at least a light incident portion is made transparent, the light for write/read/overwrite is incident through the transparent portion of the case, a permanent magnet for initialization and a permanent magnet for writing are disk-in-card which is convenient for transportation, and the thickness of the whole optical disk including the case is made thinner, thus forming the disk memory in a credit card size.

According to the present invention, there is provided a magneto-optical disk-in-card comprising:

a rotatable disk magneto-optical recording medium composed of at least two layers, a recording layer and an auxiliary recording layer formed on a transparent substrate for recording, reproducing or overwriting information based on the optical modulation, contained in a card case as being of a credit card size, at least a light incident portion of which being transparent; and magnetic field application means for initializing the auxiliary recording layer and magnetic field application device for recording information in the recording layer, both incorporated in the card case;

wherein the total thickness of the transparent substrate and the case at the light incident portion is 0.25 to 1.2 mm.

Further, according to the present invention, there is provided a magneto-optical disk-in-card comprising a rotatable disk magneto-optical recording medium formed of at least two layers, a recording layer and an auxiliary recording layer formed on a transparent substrate for recording, reproducing or overwriting information based on the optical modulation, contained inside a card case as being of a credit card size, at least a light incident portion of which being transparent, wherein the total thickness of the transparent substrate and the case at the light incident portion is 0.25 to 1.2 mm, and further comprising rotation device for rotating the magneto-optical recording medium.

Further, according to the present invention, there is provided a magneto-optical disk-in-card comprising:

a rotatable disk magneto-optical recording medium composed of at least two layers, a recording layer and an auxiliary recording layer formed on a transparent substrate for recording, reproducing or overwriting information based on the optical modulation, contained in a card case of a credit card size, at least a light incident portion of which being transparent; and magnetic field application device for initializing the auxiliary recording layer and magnetic field application device for recording information in the recording layer, both incorporated in the card case;

wherein the total thickness of the transparent substrate and the case at the light incident portion is 0.25 to 1.2 mm and the recording medium is a magneto-optical disk having a diameter of 48 to 54 am and a recording capacity of 10 MB and more.

Furthermore, according to the present invention, there is provided a magneto-optical disk-in-card comprising:

a rotatable disk magneto-optical recording medium composed of at least two layers, a recording layer and an auxiliary recording layer formed on a transparent substrate for recording, reproducing or overwriting information based on the optical modulation, contained in a card case as being of a credit card size, at least a light incident portion of which being transparent; and magnetic field application device for initializing the auxiliary recording layer and magnetic field application device for recording information in the recording layer, both incorporated in the card case;

wherein the total thickness of the transparent substrate and the case at the light incident portion is 0.25 to 1.2 mm; and further comprising:

rotation device for rotating the magneto-optical recording medium;

wherein, the recording medium has a diameter of 48 to 54 mm and a recording capacity of 10 MB and more.

Furthermore, according to the present invention, there is provided a magneto-optical disk-in-card comprising:

a rotatable disk magneto-optical recording medium having any size of 12 inches, 8 inches, 5.25 inches, 5 inches and 3.5 inches composed of at least two layers, a recording layer and an auxiliary recording layer formed on a transparent substrate for recording, reproducing or overwriting information based on the optical modulation contained inside a card case as being of a credit card size, at least a light incident portion of which being transparent;

magnetic field application device for initializing the auxiliary recording layer and magnetic field application device for recording in said recording layer incorporated in the card case;

wherein the total thickness of the transparent substrate and the case at the light incident portion is 0.25 to 1.2 mm.

Furthermore, according to the present invention, there is provided a magneto-optical disk-in-card comprising:

a rotatable disk magneto-optical recording medium having any size of 12 inches, 8 inches, 5.25 inches, 5 inches and 3.5 inches composed of at least two layers, a recording layer and an auxiliary recording layer formed on a transparent substrate for recording, reproducing or overwriting information based on the optical modulation contained inside a card case as being of a credit card size, at least a light incident portion of which being transparent;

magnetic field application device for initializing the auxiliary recording layer and magnetic field application device for recording information in the recording layer contained inside the card case;

wherein the total thickness of the transparent substrate and the case at the light incident portion is at 0.25 to 1.2 mm; and further comprising:

rotation device for rotating said magneto-optical recording medium contained inside.

Besides, the total thickness of the disk type magneto-optical recording medium and the case at the portion irradiated with light is approximately 1.2 mm.

A thin disk is formed by making the total thickness of the disk type magneto-optical recording medium and the case at the portion irradiated with light at approximately 1.2 mm.

Further, according to the present invention, there is provided an information processor comprising:

an optical disk contained in a thin case having a disk optical recording medium having a recording layer formed on a transparent substrate for recording or overwriting information with a change in a crystalline structure by irradiation with light or reproducing information by irradiation with light, and a transparent thin case which supports the optical recording medium rotatably and has at least a transparent light incident portion, in which the total thickness of the transparent substrate and the case at the light incident portion is 0.25 to 1.2 mm;

an optical head for recording required information in the optical recording medium or reproducing information already recorded therein or carrying out both;

rotation device for rotating the optical recording medium;

a drive circuit for controlling operation of the optical head and rotation speed of the rotation device;

a processor for giving an instruction to the drive circuit;

input device for inputting information to the processor; and output device for outputting information from the processor.

Further, according to the present invention, there is provided an information processor comprising:

an optical disk-in-card in which a rotatable disk optical recording medium having a recording layer formed on a transparent substrate for recording Dr overwriting information with a change in a crystalline structure by irradiation with light or reproducing information by irradiation with light is contained inside a card case as being of a credit card size having a transparent portion, and the total thickness of the transparent substrate and the case at the transparent portion is 0.25 to 1.2 mm;

an optical head for reproducing at least information recorded in the optical recording medium;

rotation device for rotating the optical recording medium;

a drive circuit for controlling operation of the optical head and rotation speed of the rotation device;

a processor for giving an instruction to the drive circuit;

input device for inputting information to the processor; and output device for outputting information from the processor.

Furthermore, according to the present invention, there is provided an information processor comprising:

an optical disk-in-card in which a rotatable disk optical recording medium having a recording layer formed on a transparent substrate for recording or overwriting information with a change in a crystalline structure by irradiation with light or reproducing information by irradiation with light is contained inside a card case as being of a credit card size, at least a light incident portion of which being transparent and the total thickness of the transparent substrate and the case at the transparent portion is 0.25 to 1.2 mm, and rotation device for rotating the optical recording medium is contained inside;

an optical head for reproducing at least information recorded in the optical recording medium;

a drive circuit for controlling operation of the optical head and rotation speed of the rotation device;

a processor for giving an instruction to the drive circuit;

input device for inputting information to the processor; and output device for outputting information from the processor.

Furthermore, according to the present invention, there is provided an optical disk-in-card comprising:

a rotatable disk optical recording medium having a recording layer formed on a transparent substrate for recording or overwriting information with a change in a crystalline structure by irradiation with light or reproducing information by irradiation with light contained inside a card case as being of a credit card size, at least a light incident portion of which being transparent;

wherein the total thickness of the transparent substrate and the case at the light incident portion is 0.25 to 1.2 mm.

Furthermore, according to the present invention, there is provided an optical disk-in-card comprising:

a rotatable disk optical recording medium having a recording layer formed on a transparent substrate for recording or overwriting information with a change in a crystalline structure by irradiation with light or reproducing information by irradiation with light contained inside a card case as being of a credit card size, at least a light incident portion of which being transparent;

wherein the total thickness of the transparent substrate and the case at the light incident portion is 0.25 to 1.2 mm; and further comprising:

rotation device for rotating the optical recording medium.

Furthermore, according to the present invention, there is provided an optical disk-in-card comprising:

a rotatable disk optical recording medium having a recording layer formed on a transparent substrate for recording or overwriting information with a change in a crystalline structure by irradiation with light or reproducing information by irradiation with light contained inside a card case as being of a credit card size, at least a light incident portion of which being transparent;

wherein the total thickness of the transparent substrate and the case at the light incident portion is 0.25 to 1.2 mm, and the recording medium is an optical disk having a diameter of 48 to 54 mm and a reproducing capacity of 10 MB or more.

Furthermore, according to the present invention, there is provided an optical disk-in-card comprising:

a rotatable disk optical recording medium having a recording layer formed on a transparent substrate for recording or overwriting information with a change in a crystalline structure by irradiation with light or reproducing information by irradiation with light contained inside a card as being of a credit card size, at least a light incident portion of which being transparent;

wherein the total thickness of the transparent substrate and the case at the light incident portion is 0.25 to 1.2 mm; and further comprising:

rotation device for rotating the optical recording medium;

wherein the recording medium is an optical disk having a diameter of 48 to 54 mm and a recording capacity of 10 MB or more.

Furthermore, according to the present invention, there is provided an optical disk-in-card comprising:

a rotatable disk optical recording medium having any size of 12 inches, 8 inches, 5.25 inches, 5 inches and 3.5 inches including a recording layer formed on a transparent substrate for recording or overwriting information with a change in a crystalline structure by irradiation with light and reproducing information by irradiation with light contained inside a card case as being of a credit card size, at least a light incident portion of which being transparent;

wherein the total thickness of the transparent substrate and the case at said light incident portion is 0.25 to 1.2 mm.

Furthermore, according to the present invention, there is provided an optical disk-in-card comprising:

a rotatable disk optical recording medium having any size of 12 inches, 8 inches, 5.25 inches, 5 inches and 3.5 inches including a recording layer formed on a transparent substrate for recording or overwriting information with a change in a crystalline structure by irradiation with light and reproducing information by irradiation with light contained inside a card case as being of a credit card size, at least a light incident portion of which being transparent;

wherein the total thickness of the transparent substrate and the case at said light incident portion is 0.25 to 1.2 mm; and further comprising:

rotation device for rotating the optical recording medium contained therein.

Further, according to the present invention, there is provided an information processor comprising:

a magneto-optical disk contained in a thin case including a disk magneto-optical recording medium having a recording layer and an auxiliary recording layer formed on a transparent substrate for recording, reproducing or overwriting information based on optical modulation, a thin case for supporting the disk magneto-optical recording medium rotatably, at least a light incident portion of which being transparent, and magnetic field application device in a thin film form for initializing the auxiliary recording layer and magnetic field application device in a thin finn form for recording information in the recording layer, in which the total thickness of the transparent substrate and the case at the light incident portion is 0.25 to 1.2 mm;

an optical head for recording required information in the magneto-optical recording medium or reproducing information already recorded therein, or carrying out both;

rotation device for rotating the magneto-optical recording medium;

a drive circuit for controlling operation of the optical head and rotation speed of the rotation device;

a processor for giving an instruction to the drive circuit;

input device for inputting information to the processor; and output device for outputting information from the processor.

Also, it is preferable that there are provided a disk type optical recording medium formed on a transparent substrate for writing and reading of information by irradiation with light and a case which covers the recording medium and the substrate and in which the portion irradiated with light is transparent on the substrate, and that the total thickness of the above-mentioned substrate and the case at the portion irradiated with light is approximately 1.2 mm.

Further, it is preferable that there are provided a disk type optical recording medium formed on a substrate to write or read information by irradiation with light and a case which covers the recording medium and the substrate and in which the portion irradiated with light is transparent on the recording medium, and that the thickness of the case at the portion irradiated with light is approximately 1.2 mm.

Besides, an optical disk having 48 to 54 mm in diameter and more than 10 MB in recording capacity and above is disk-in-card.

Further, an information processor of the present invention comprises an optical head which performs at least one of write, read and erase of information on a recording medium formed on a substrate by irradiating light on an optical memory incorporated rotatably in a case having a transparent portion through above-mentioned transparent portion of the case, a rotation device which rotates above-mentioned recording medium, and a drive circuit which controls the optical head and the operation of the above-mentioned rotation device.

Furthermore, the information processor comprises an optical memory having a recording medium formed on a substrate incorporated rotatably in a case having a transparent portion, an optical head which performs at least one of write/read/erase of information on the above-mentioned recording medium through the transparent portion of the case, a rotation device which rotates the recording medium, and a drive circuit which controls the optical head and the operation of the rotation device.

According to the present invention, a rotatable disk magneto-optical recording medium composed of at least two layers of a recording layer and an auxiliary recording layer for write/read or overwrite of information by laser power modulation is disk-in-card of credit card size, and a light incident portion for write/read or overwrite includes a first magnetic field application device which initializes the above-mentioned auxiliary recording layer in a transparent card case to thereby realize a magneto-optical disk-in-card of a credit card size. Furthermore, it is possible to make the magneto-optical disk memory device thinner by utilizing this magneto-optical disk-in-card.

Since a conventional optical disk used a substrate having a thickness of 1.2 mm and was put in a protective case 1 to 2 mm in thickness, the total thickness of 6 to 10 mm has been required for the optical disk and the protective case. On the contrary, the present invention has a feature for preventing dust from sticking to the optical disk by providing a protective case which has been heretofore opaque transparent and radiating an optical beam for write/read/erase through this transparent protective plate. Accordingly, it has become possible to render obsolete a substrate having a thickness of 1.2 mm which has been deemed indispensable for a conventional optical disk and to reduce the thickness of the whole optical disk memory including the case.

In order to achieve the above-described object, according to an aspect of the present invention, there is provided an optical disk memory unit comprising a transparent substrate, an optical disk having a recording medium formed at least on one surface thereof, and a case incorporating the optical disk rotatably, wherein the case has a transparent portion at least at a part of a surface opposing the recording medium, and the thickness of the substrate and the transparent portion of the case is specified, respectively, so that an expression:

$$d1n1+d2n2<1.2n0$$

is satisfied when it is assumed that the thickness and the refractive index of the substrate are d1 and n1 respectively, and the thickness and the refractive index of the transparent portion are d2 and n2, respectively, and that the refractive index of an optical disk in which the thickness of the substrate is standardized at 1.2 mm, is nO.

The above-mentioned standardized optical disk has the refractive index in a range from 1.46 to 1.6 and the substrate thickness of 1.2 mm, for instance. Although general specification is shown in the above-mentioned conditional expression of the present invention, it is possible to set the refractive index of an optical disk of the present invention to a standardized value. Further, it is also possible to set the refractive index of the transparent portion of the case to a similar value. in this case, the conditional expression will be shown as follows.

$$d1+d2<1.2$$

In the above-mentioned case, an opening for coupling the optical disk with a rotation drive mechanism for rotating the optical disk is provided.

When the opening is not closed, pads may be arranged around the opening on the surface of the inner side of the case. It is preferable to provide these pads at positions where the pads are positioned within a non-recording area on the inner circumference of the optical disk. Further, it is possible to arrange the pads on both surface sides of the optical disk.

Furthermore, the pad is arranged in such a manner that the surface opposing the optical disk surface comes in slight contact with the optical disk surface or comes close thereto to such an extent that it does not come in contact therewith.

It is also possible for the case to make the whole surface opposing the recording medium transparent.

According to a more concrete aspect of the present invention, there is provided an optical disk memory unit having an optical disk which is 48 to 54 mm in outside diameter and has a recording capacity of 10 MB, formed on a transparent substrate having the thickness of 0.05 mm to 1.0 mm, for recording or reproducing information optically and a case, being of a credit card size including a transparent portion, and incorporating the optical disk rotatably in the case. In this case, it is possible to make the storage capacity of the optical disk memory unit to be 20 MB and more.

Further, according to the present invention, there is provided an information processor having a function for executing at least one processing among recording, reproducing and erasing of information with respect to an optical disk memory unit provided with an optical disk having a transparent substrate and a recording medium formed on at least one surface thereof, and a case which contains this optical disk rotatably and has a transparent portion at least at a part of the surface opposing to the recording medium, comprising:

an optical disk memory unit mounting portion for mounting detachably optical disk memory units, respective thickness of which being specified, so that the substrate and the transparent portion of the case satisfy the following expression:

$$d1n1+d2n2<1.2\, n0$$

when it is assumed that the thickness and the refractive index of the substrate are d1 and n1 respectively, and the thickness and the refractive index of the transparent portion are d2 and n2, respectively, and the refractive index of an optical disk, in which the thickness of the substrate is standardized at 1.2 mm, is n0;

at least one optical head;

a rotation device for rotating the optical disk of the mounted optical disk memory unit; and a drive circuit for controlling operation of the optical head and rotation of the rotation device.

As the above-described optical head, for example, an optical head having an objective lens of an aperture diameter is determined by a ratio:

$$(d1n1+d2n2)/1.2n0$$

for the aperture diameter of an objective lens of an optical head used in an optical disk, in which the thickness of the substrate is standardized at 1.2 mm, is used.

Since a conventional optical disk has been contained in a protective case of 1 to 2 mm in thickness in addition to use a substrate 1.2 mm in thickness, the thickness of 5 to 6 mm has been required for the optical disk. On the contrary, a recording medium is formed on a transparent substrate 0.05 mm to 1.0 mm in thickness according to the present invention. Accordingly, it is possible to reduce the substrate thickness of 1.2 mm, which had been deemed indispensable for an optical disk, thus making the total thickness of the optical disk including the case thinner than 1.2 mm.

With such a construction, it is possible to form the thickness of the protective case as thin as 1.5 mm to 4 mm in which the optical disk is contained inside. By making the protective case thinner as described above, it becomes possible to reduce the distance between the objective lens of the optical head and the recording medium surface for the read/write and the like of information. As a result, it becomes possible to use an objective lens having a short focal length, and to use a lens of a small aperture diameter. Thus, it is possible to miniaturize the whole optical system to match the objective lens.

Further, with such a construction, it is possible to contain an optical disk in a case being of a credit card size which is handy to carry, and to realize a memory of a large capacity of at least 20 MB for instance, which has not been realized with a memory for a miniature information processor such as conventional lap-top computer, note type computer and the like.

According to the present invention, dust is prevented from sticking to the recording medium by housing an optical disk inside a case as being of a card size. in particular, when pads are provided around the opening of a case, dust is prevented from entering by means of these pads, thus making it possible to prevent dust accumulation more effectively. Further, by providing a substrate having the thickness of d1, i.e., 0.1 mm to 1.0 mm for a recording medium, it is possible to not disturb the write/read operation and the like of information even if inevitable very small dust, i.e., 10 μm and less in size, sticks thereto.

In this case, the pad has a simple structure and can be formed to be very thin. Accordingly, the pad will never be an obstacle in forming the optical disk memory unit in a thin form. Further, the pad is able to suppress surface deflection of the optical disk in addition to its dust preventive operation.

Further, since the pad has a simple structure and may be installed easily, the cost of the optical disk memory will not be increased.

According to the present invention, it is possible to provide an information processor which protects the disk against dust and dirt and is able to prevent write/read mistakes caused by dust and dirt stuck thereto at the same time. Furthermore, it is possible to realize a thin lap top computer having a memory of large capacity, a still camera of a large capacity and a medical portable personal data base having a large capacity memory by utilizing a disk-in-card of the present invention.

BRIEF DESCRIPTION OF THE DRAWINGS

FIG. 1 is a block diagram showing a device composition of an embodiment of the present invention;

FIG. 2A is a plan view showing an embodiment of a magneto-optical disk-in-card of the present invention;

FIG. 2B is a sectional view taken along arrow marks IIB—IIB in FIG. 2A;

FIG. 2C is a sectional view taken along arrow marks IIC—IIC in FIG. 2A;

FIG. 2D is an enlarged sectional view of the section shown in FIG. 2C;

FIG. 14A is a composition diagram showing an embodiment of an optical head for a phase-change optical disk;

FIG. 14B is a side view of the optical head shown in FIG. 14A;

FIG. 24 and FIG. 25 are sectional views showing examples of countermeasures for preventing the mixing of dust and dirt into recording areas of the optical disk;

FIG. 26A is a plan view showing another embodiment of an optical disk-in-card;

FIG. 26B through FIG. 26D are respective side views of the optical disk-in-card shown in FIG. 26A;

FIG. 27 is a plan view showing another embodiment of a magneto-optical disk-in-card;

FIG. 28A is a plan view showing still another embodiment of the optical disk-in-card;

FIG. 28B and FIG. 28C are respective Await views of the magneto-optical disk-in-card shown in FIG. 28A;

FIG. 30 and FIG. 31 are sectional views showing other examples of countermeasures for preventing mixing of dust and dirt into the recording area of an optical disk;

FIG. 32A is a plan view showing another embodiment of an optical disk-in-card;

FIG. 32B through FIG. 32D are respective side views of the optical disk-in-card shown in FIG. 32A;

FIG. 33 is a block diagram showing a composition in case, the optical disk-in-card is applied to a lap top computer;

FIG. 42A is a plan view showing still another embodiment of the optical disk-in-card;

FIG. 42B is a sectional view taken along arrow marks XLIIB—XLIIB in FIG. 42A;

FIG. 43A is a plan view showing another embodiment of the optical disk-in-card; and FIG. 43B and FIG. 43C are respective side views of the magneto-optical disk-in-card shown in FIG. 43A.

DETAILED DESCRIPTION OF THE EMBODIMENTS

Figure 3:
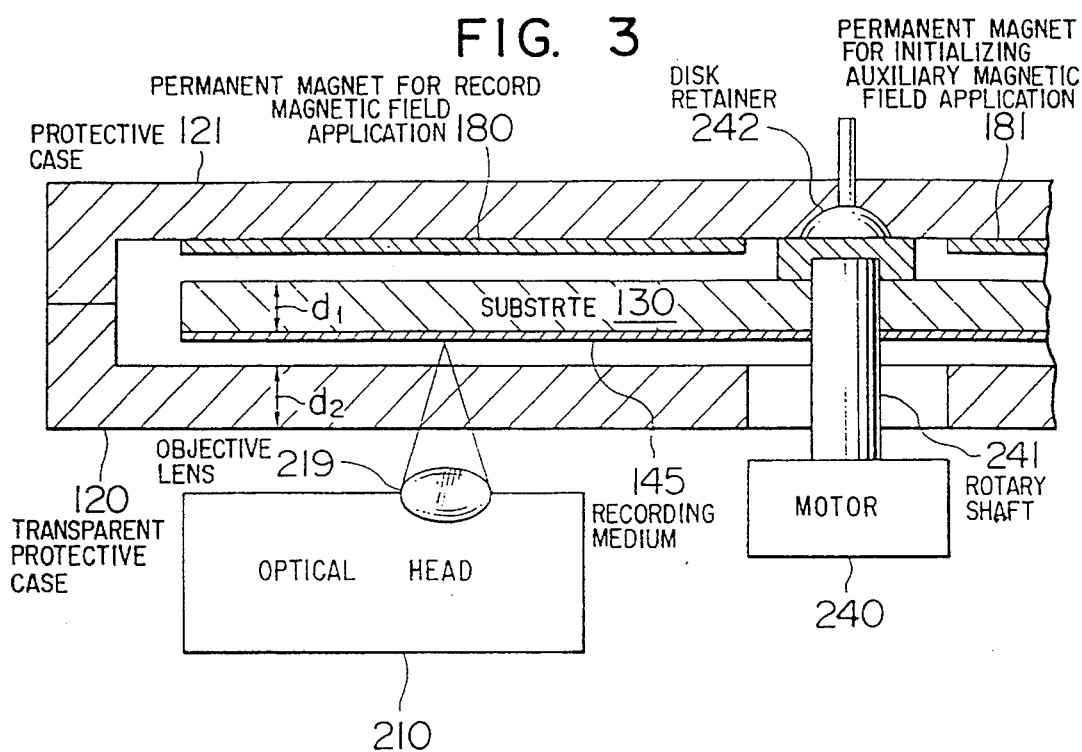
FIG. 3 is a sectional view showing another embodiment of FIG. 2D.

An embodiment of the present invention will be described hereafter with reference to drawings. FIG. 1 shows a conceptual diagram of an information processor of the present invention.

The information processor of the present invention is composed of an optical disk-in-card 100 consisting of a transparent protective case 120 housing at least one recording layer of a rotatable disk type optical disk memory 140 of a recording layer, an optical disk drive, a processor 400, an input means 500 and an output means 600.

The magneto-optical disk-in-card 100 incorporated in a transparent protective case is composed of a transparent protective case 120 housing a magneto-optical disk memory 140, a first magnetic field application means for initializing an auxiliary recording layer and a second magnetic field application means for recording information a recording layer, and is detachable from the disk drive 200.

Furthermore, an optical disk memory such as a phase-change type, write-once type, and/or read-only type may also be used in place of the magneto-optical disk memory 140. In this case, the optical disk is incorporated in a transparent protective case is composed of an optical disk and a transparent protective case.

Further, the disk drive 200 is composed of an optical head 210 for write, read and overwrite, a motor 240 for rotating the optical disk 140 and a drive circuit 260 for controlling the optical head 210 and the motor 240. The optical head 210 is provided with an objective lens 219 for irradiating the optical disk 140 with light.

The drive circuit 260 controls the rotation speed of the motor 240 and also fulfills functions of modulation of data for write/overwrite and demodulation of data for read in accordance with an instruction from the processor 400.

Further, the processor 400 performs arithmetic processing or write/read in and from the magneto-optical disk 140 in accordance with an instruction from the input means 500, and outputs the written information in the magneto-optical disk 140 or processes results through the output means 600.

FIG. 2A, FIG. 2B, FIG. 2C and FIG. 2D show an embodiment of the magneto-optical disk-in-card incorporated in a transparent protective case best suited for executing the present invention. Besides, the optical head 210 and the motor 240 for rotating the optical disk 140 are shown additionally in the detailed portion of the magneto-optical disk-in-card. At the terminal portion of a rotary shaft 241 extending from the motor 240, a disk retainer 242 and a level 243 are provided so as to fix the optical disk 140.

As shown in respective figures, the magneto-optical disk 140 is incorporated in a protective case 120, 121 of a credit card size in the magneto-optical disk-in-card 100 of the present embodiment. A permanent magnet 180 for magnetic field application for initializing the auxiliary recording layer and a permanent magnet 181 for magnetic field application for writing in the recording layer are formed on the disk in the transparent protective case 121. It is better for the permanent magnet 180 for magnetic field application for initialization and the permanent magnet 181 for magnetic field application for recording to both be fixed at a length a little longer than the radial length of the recording area of the magneto-optical disk of the magneto-optical disk memory card because initialization and writing can be executed up to the innermost periphery or the outermost periphery of the disk. Further, configurations of the permanent magnet 180 for magnetic field application for initialization and the permanent magnet 181 for magnetic field application for recording may be rectangular when the rotation speed of the disk is as low as 1,800 rpm. When the rotation of the disk reaches 3,600 rpm and higher, it is more preferable to form the configurations of the permanent magnet 180 for magnetic field application for initialization and the permanent magnet 181 for magnetic field application for writing in sectors so that the circuit arc is small at the inner periphery of the disk and the circular arc is large at the outer periphery of the disk for initialization and writing. The manufacture of the permanent magnet 180 for magnetic field application for initialization and the permanent magnet 181 for magnetic field application for writing may be made by cutting out of a bulk material and adhering with adhesives, or by any of thin film forming methods such as a vacuum deposition method, a sputtering method and an ion beam sputtering method.

At least a light beam incident portion 152 of the protective case is composed of a transparent plate in the magneto-optical disk 140.

In a conventional magneto-optical disk unit, a window of the protective case was opened so that light is directly incident to an optical disk when light was incident. Therefore, dust and dirt Entered through the window for light incidence, and it was required to use a transparent substrate having a thickness of 1.2 mm for the substrate as a countermeasure thereagainst.

On the contrary, since the light incident portion 152 is covered with the transparent protective plate 120 in the magneto-optical disk-in-card of the present invention, dust and dirt will never stick directly to the optical disk. Accordingly, the substrate for supporting the optical disk medium does not need to have the thickness of 1.2 mm. According to the present invention, dust in air does not stick to a substrate 130 and a reading medium 145 consisting of an auxiliary recording layer and recording layer, thus producing an effect that the substrate having a thickness of 1.2 mm which has been heretofore deemed indispensable may be made thinner by forming the total of the plate thickness $d_2$ of the transparent protective case 120 and the plate thickness $d_1$ of the substrate 130 in approximately 1.2 mm.

FIG. 3 shows another embodiment in place of FIG. 2D. When the thickness $d_2$ of the transparent protective plate is made at approximately 1.2 mm, it is not required to have light incident from the substrate 130 side, thus making it possible to use for the substrate 130 a metal, a metallic foil and an organic material having no light permeability such as an aluminum foil made thinner by cold processing and an alloy foil thereof, a stainless steel foil, and a titanium foil or an alloy foil thereof.

Further, the magneto-optical disk is fixed to the rotary shaft 241 and rotated, but is retained by the disk retainer 242 for stable rotation. Besides, the protective case 121 having no light incident portion, it may be either transparent or opaque.

Moreover, in the magneto-optical disk-in-card of the present invention, the magneto-optical disk 140 is not fixedly attached to the protective case 120, 121, but is made freely rotatable.

Figure 4:
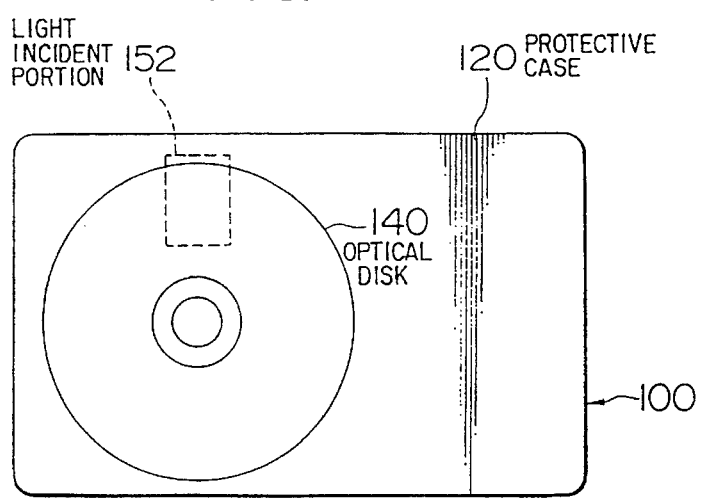
FIG. 4 is a plan view showing an optical disk-in-card.

FIG. 4 shows an embodiment of an optical disk memory such as a phase-change type, write-once type, and/or read-only type contained in a transparent protective case (hereafter referred to as an "optical disk-in-card") best suited to realize an optical disk memory of the present invention, and the section of this figure is the same as FIG. 2C. Referring to FIG. 2C, the optical disk 140 incorporated in the protective case 120, 121 each in a card in a card size in the optical disk-in-card 100. Here, at least the light beam incident portion 152 of the protective case is formed of a transparent protective plate in the optical disk 140.

In a conventional optical disk unit, the window of the protective case was also opened like a magneto-optical disk unit so as to have light incident directly to the optical disk when light was incident. Therefore, since dust and dirt entered through the window for light incidence, it has been required to use a transparent substrate having a thickness of 1.2 mm for the substrate as a countermeasure.

On the contrary, since the light incident portion 152 is covered with the transparent protective plate 120 in the optical disk memory of the present invention, dust and dirt will never stick directly to the optical disk, thus the thickness of the substrate for supporting the optical disk medium does not have to be 1.2 mm.

Further, in the optical disk memory of the present invention, the optical disk 140 is not fixedly attached to the protective case 120, but is made freely rotatable.

Figure 5A:
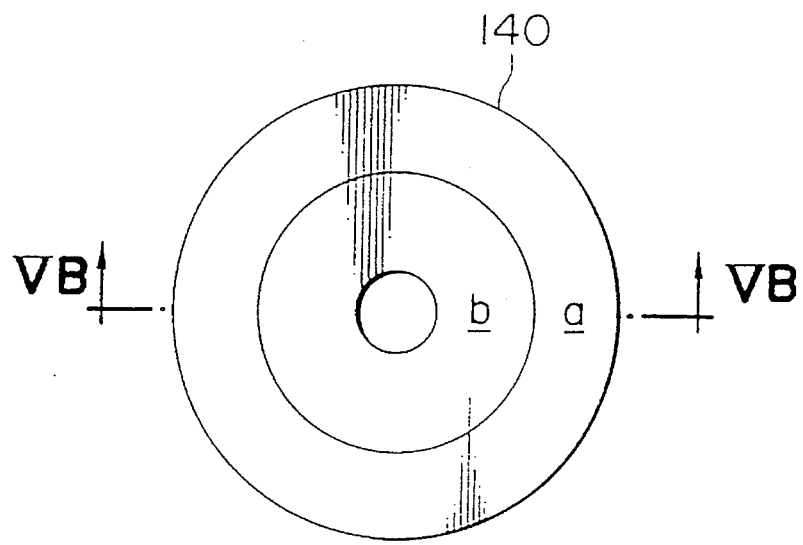
FIG. 5A is a plan view showing an optical disk in the optical disk-in-card.
Figure 5B:
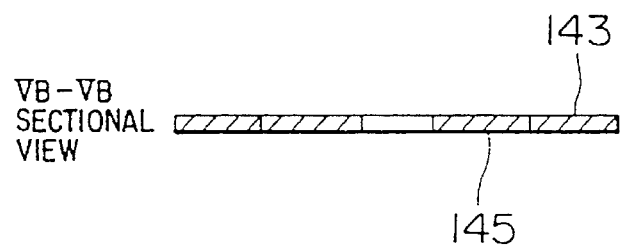
FIG. 5B is a sectional view taken along arrow marks VB—VB in FIG. 5A.

FIG. 5A and FIG. 5B show an embodiment of an optical disk in the optical disk-in-card 100. The optical disk 140 is formed of a substrate 143 and a recording medium 145. In these figures, a indicates a recording area and b indicates a non-recording area.

Here, the memory capacity for an optical disk-in-card is estimated. In the field of an IC card and a memory card, the outside dimension of a case has been already standardized, and the overall size is approximately 54 mm×86 mm.

In the optical disk-in-card 100 of the present invention, it is preferable that the size of the protective case is also substantially in accordance with the size of the card in order to be used as a portable memory.

Thereupon, the memory capacity is estimated here assuming that a protective case having the overall size of 54 mm×86 mm is used. Since the breadth is 54 mm, it is preferable that the outside dimension of the optical disk is 50 mm and less when 1 mm is assigned to edges, respectively. Further, since it is preferable that the recording area a in the optical disk is located about 1 mm inside the overall size of the disk, the outside diameter of the recording area is preferably approximately 48 mm.

On the other hand, the inside diameter of the recording area a is determined depending on the sizes of hub fitting for disk rotation and the disk retainer portion. Since about 15 to 28 mm is sufficient for the disk retainer portion, it may be concluded that 15 mm to 48 mm may be used as the recording area. When the outside dimension of the recording area is given, the memory capacity reaches the maximum when the inside diameter is selected at half of the outside dimension.

Thereupon the memory capacity when 24 mm to 48 mm is used as the recording area is estimated here. When an ordinary optical disk system is used eyesight, 1.6 μm is adopted as the spacing between tracks. Therefore, 7,500 tracks are obtained when the number of tracks are estimated with the above. Besides, since the bit density is approximately 1.4 μm/bit, the number of bits per track is obtained at approximately 51.8 Kbits per track.

Accordingly, a recording capacity of approximately 50 MB (mega bytes) is obtainable at the time of unformat for the whole recording area.

Figure 6:
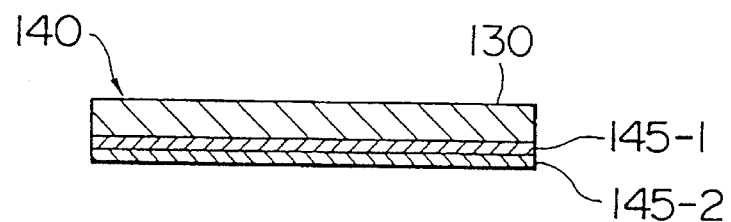
FIG. 6 is a sectional view of a magneto-optical disk.

FIG. 6 shows an embodiment of an magneto-optical disk in the magneto-optical disk-in-card 100. The magneto-optical disk 140 is composed of the recording medium 145 consisting of the substrate 130, the auxiliary recording layer and the recording layer. FIG. 6 is a partial sectional view showing another embodiment of the magneto-optical disk 140 shown in FIG. 5l. When light is incident from the substrate 130 side as shown in FIG. 2D, the substrate 130 needs to be transparent with respect to the wavelength of light Employed. Among recording media, 145-1 becomes the write layer and 145-2 becomes the auxiliary recording layer. Further, 145-1 becomes the auxiliary recording layer and 145-2 becomes the recording layer among recording medium when light is incident from the side of the recording medium 145 as shown in FIG. 3. In the case of the latter, the substrate 130 may be either transparent or opaque.

Here, the capacity, etc. of the memory for the magneto-optical disk-in-card is substantially similar to that of the memory for the optical disk-in-card.

That is, it becomes possible to make in optical or magneto-optical disk-in-card thinner, and therefore make an information processor such as a lap top computer thinner.

Figure 7:
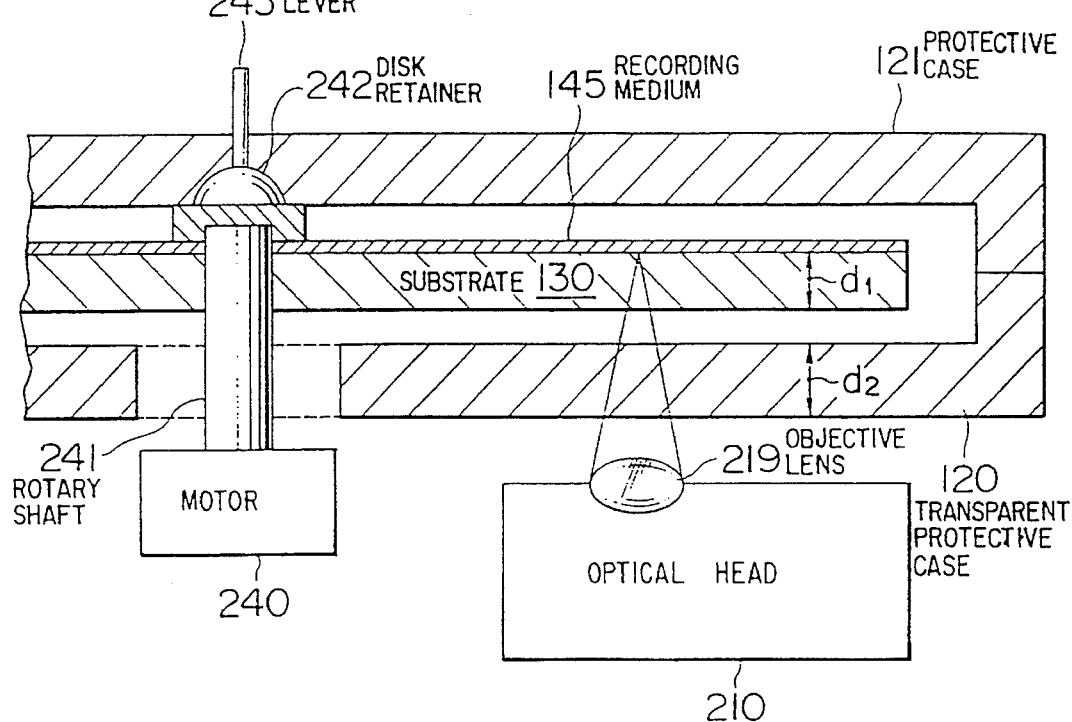
FIG. 7 is an enlarged sectional view showing an optical disk-in-card.
Figure 8:
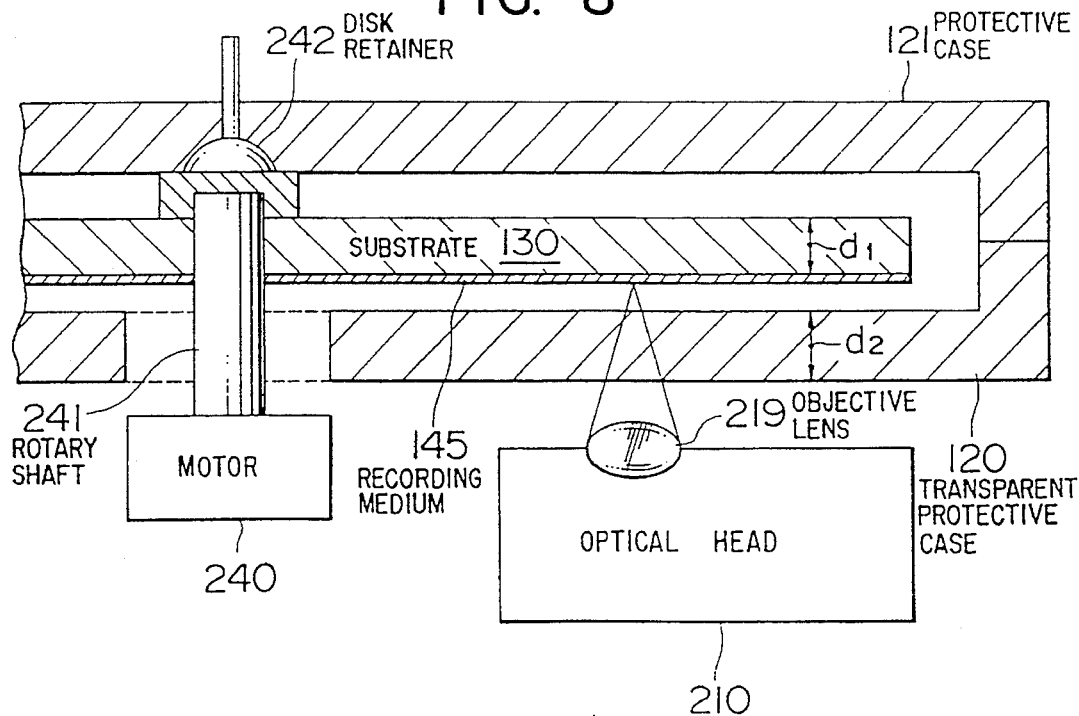
FIG. 8 is an enlarged sectional view showing another embodiment of the optical disk-in-card

FIG. 7 and FIG. 8 are for explaining the concept of the present invention using an optical disk-in-card, and correspond to FIG. 2D and FIG. 3. With this, it becomes possible to make the optical disk thinner, and therefore make an information processor such as a lap top computer thinner.

As shown in FIG. 7, the present invent-on is composed of the substrate 130 supporting the recording medium 145, a protective case 120, 121 for protecting them, the motor 240 for rotating a disk and the optical head 210. The optical head may be realized essentially with an optical system as described in Nikkei Electronics, Nov. 21, 1983, pp. 189–213.

Write/read/erase of the optical disk are implemented with such a composition as follows. That is, new information is recorded on old information by modulating the power of a semiconductor laser in the optical head 210 between an erasing power and a writing power at the time of write/erase.

Further, the reflectance of the optical disk is read by contracting the semiconductor laser power to a comparatively small power and radiating it continuously at the time of reading. Here, a feature of the present invention exists in that a laser beam is radiated to the recording medium 145 through the transparent protective case 120.

That is, according to the present invention, there is such an effect that dust in air will never stick to the substrate 130 and the recording medium 145, and the substrate having a thickness of 1.2 mm which has been heretofore deemed indispensable may be made thinner by making the total of the plate thickness $d_2$ of the transparent protective case 120 and the plate thickness $d_1$ of the substrate 130 approximately 1.2 mm.

Similarly, when the thickness $d_2$ of the transparent protective plate of the present invention is made to be approximately 1.2 mm as shown in FIG. 8, it is not necessary to have light incident from the substrate 130 side, then a material having no light permeability can be used for the substrate 130. Further, the optical disk is fixed to the rotary shaft 241 and rotated, but is retained by the disk retainer 242 for stable rotation. Furthermore, since the protective case 121 is not a light incident portion, it may be either transparent or opaque.

Next, a recording medium best suited to realize the present invention will be explained. As the recording medium, a read-only medium such as a compact disk, a write once optical recording medium utilizing hole boring and phase-change, and a reversible optical read medium utilizing magneto-optical effect and phase-change may be used. That is, any medium which is able to read or write/erase by means of a laser beam may be used as a medium in the present invention.

Figure 9:
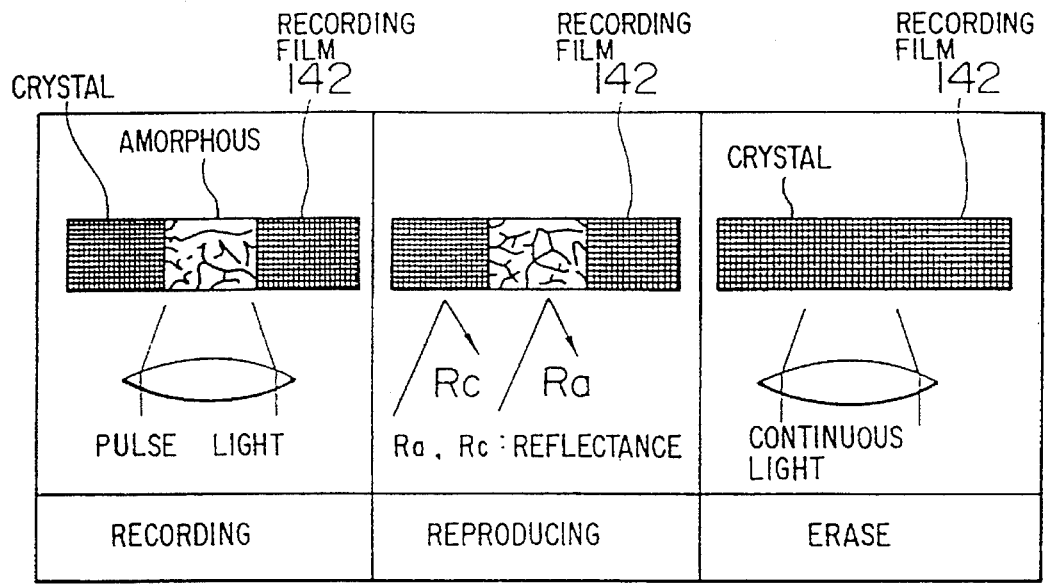
FIG. 9 is an explanatory diagram of principles of write/read/erase of a phase-change optical disk.

Here, an example of write/erase/read utilizing a reversible phase-change optical disk will be Explained. FIG. 9 shows principles of write/erase/read of a phase-change optical disk. As shown in the figure, writing is realized by irradiating a recording medium with a laser beam of comparatively high power and quenching a recording film 142 after melting, thereby to bring the recording film 142 into an amorphous state. On the other hand, erasing-is realized by irradiating the recording film 142 with a laser beam of comparatively low power and bringing the recording film 142 in amorphous state under a crystallized state. Further, reading is performed in such a manner that the recording medium is irradiated with continuous light of further lower power, thereby to read information by the difference between reflection factors under amorphous and crystallized states.

Any phase-change medium such as an In—Eb—Te recording film described in Proc. Soc. Photo-Opt. Inst. Eng. (SPIE), Vol. 1078, pp. 11–26, (1989) or a recording film capable of overwrite described in Proc. Soc. PhotoOpt. Inst. Eng (SPIE), Vol. 1078, pp. 27–34, (1989) may be used as the recording film 142.

Figure 10:
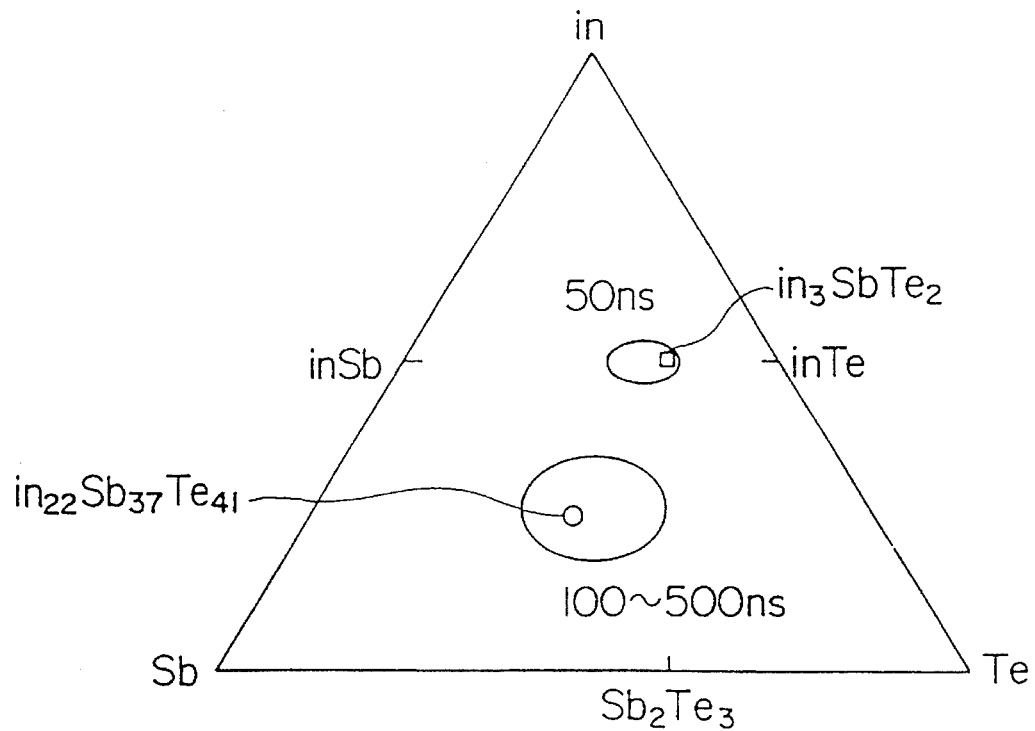
FIG. 10 is a diagram showing a crystallizing speed of an In—Sb—Te write medium which is an example of a material for a phase-change optical disk.

FIG. 10 shows the crystallization time of an In—Sb—Te material, but this recording film 142 has different crystallization times depending on the composition of the material and has a crystallization time ranging from 50 ns to 500 ns. Although there is a variation to some extent in selecting which crystallization time to be adopted depending on a linear velocity v(m/s) of the optical disk and a film structure of the optical disk medium, it is preferable to adopt a recording film having a crystallization time in the range of approximately from 500/v ns to 1,500/v ns.

Figure 11:
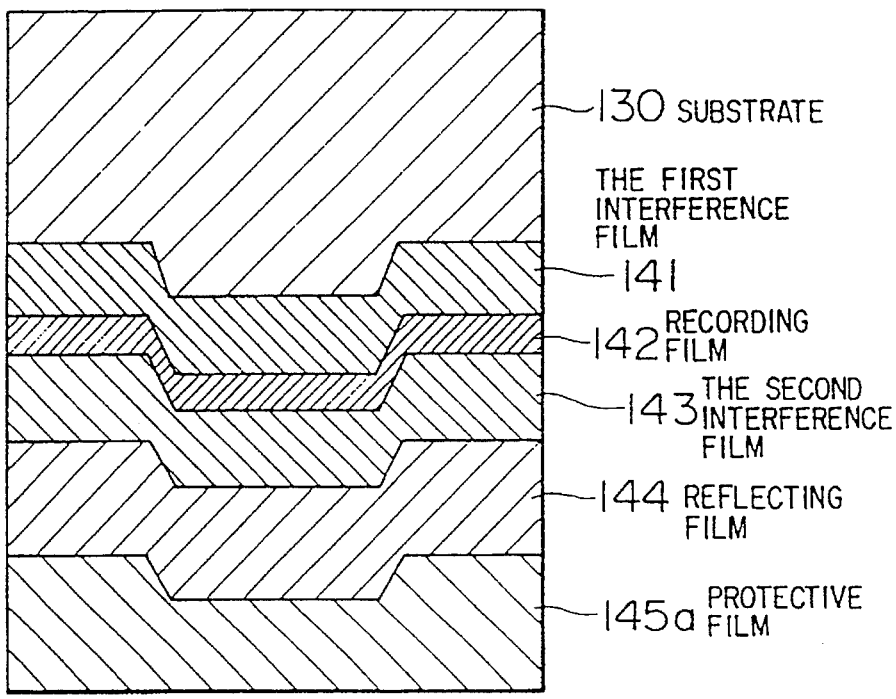
FIG. 11 and FIG. 12 are sectional views showing a multilayer film composition of the optical disk.

Further, FIG. 11 shows a film structure best suited to be used for the optical disk medium shown in FIG. 7. The optical disk medium is composed of a light permeable substrate 130, a first light interference film 141 having a high refractive index characteristic, a recording film 142, a second light interference film 143 having a high refractive index characteristic, a reflecting film 144 and a protective film 145a. In such an optical disk medium, light is incident from the substrate side.

Figure 12:
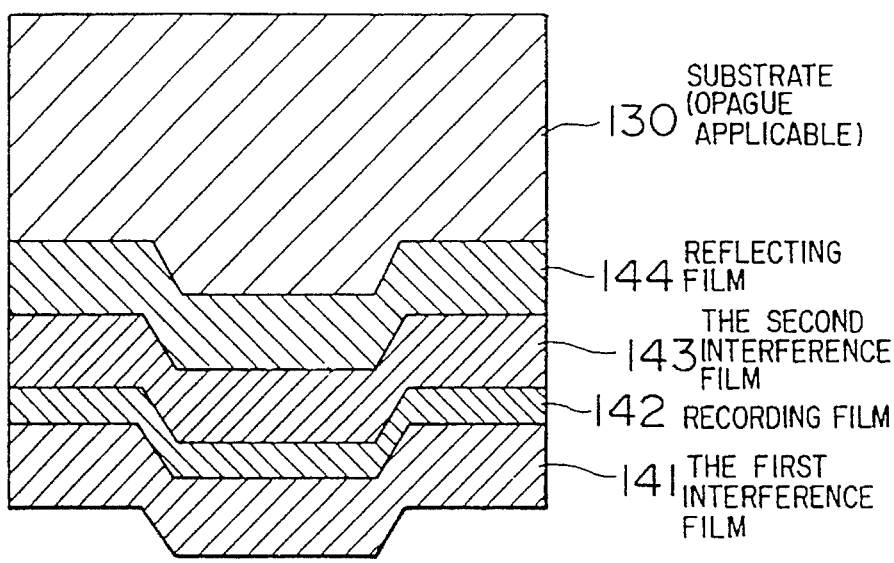

On the other hand, FIG. 12 shows a finn structure best suited to be used as the optical disk medium shown in FIG. 8. In this case, a feature exists in that the order from the first light interference film 141 to the reflecting film 144 is reversed because the laser beam is incident from the protective film. Here, the interference film fulfills the functions of improvement of contrast by light interference and a control film of heat conduction characteristic.

Figure 13:
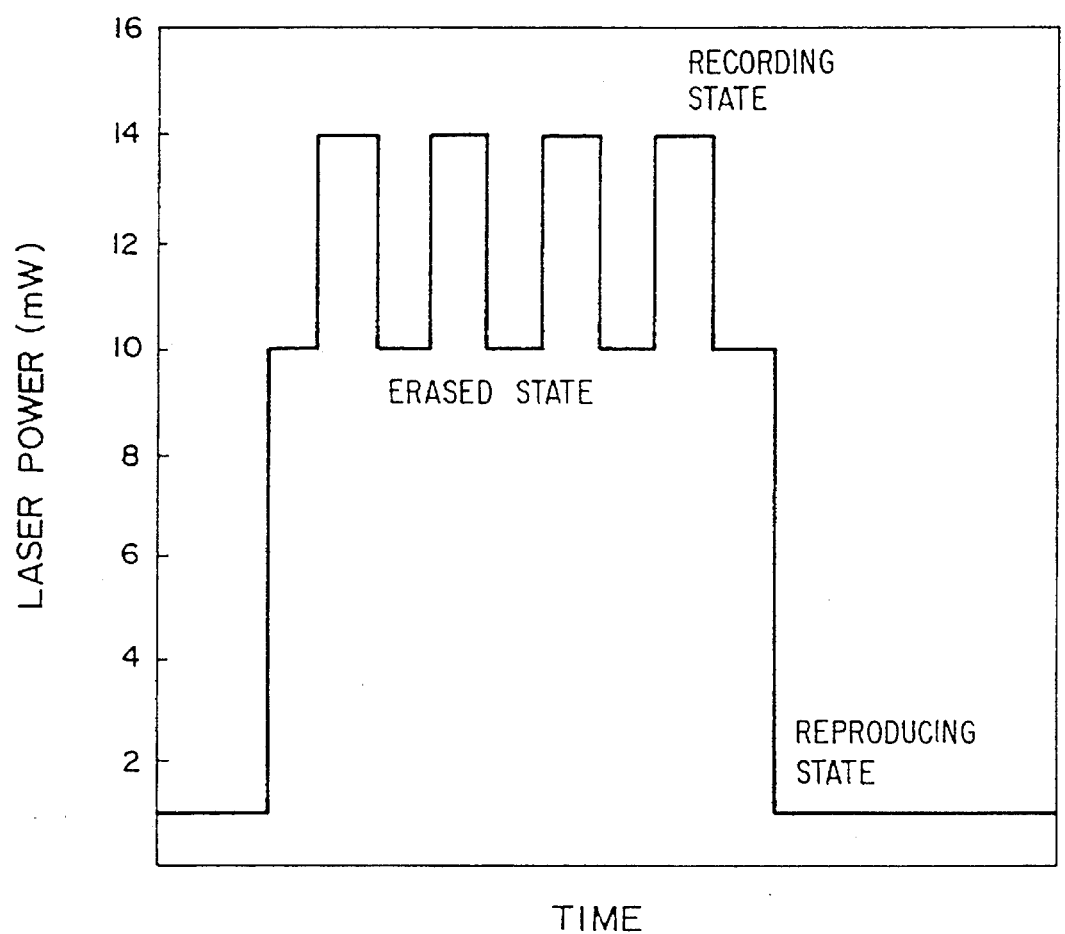
FIG. 13 is an explanatory view of a modulation method of laser power.

FIG. 13 shows a modulation method of the laser power at the time of overwriting. That is, the laser power is modulated between the power level for Erasing and the power level for recording at the time of overwriting. At this time, the laser power for erasing is selected from the power which is able to crystallize the recording film when this power is continued to be radiated, and the power for recording is selected from the power which is able to bring the recording film under an amorphous state.

FIG. 14A and FIG. 14B show an example of the optical head 210 best suited to execute the present invention. In a conventional optical head, an actuator for driving an objective lens was provided for focal point control, but it was difficult to make the optical head thinner because of this actuator. in the optical head 210 of the present invention, the actuator for the objective lens 219 is deleted, and a relay lens 216 is provided instead and moved in a parallel direction with the disk, thereby to realize focal point control. Further, aberration on a disk is compensated in an ordinary objective lens by utilizing a plurality of lenses, but a part thereof is split and moved to the whole surface of a riser mirror 218 so as to make the optical head thinner.

The optical head 210 shown in FIG. 141 will be described. Luminous flux emitted from a semiconductor laser 211 passes through a collimator lens 212 and a shaping prism 213, and the luminous flux is reflected by a polarizing prism 214. The reflected luminous flux passes through a condenser lens 220 for detection, and is detected by an optical sensor 221. The luminous flux which has passed through the polarizing prism 214 passes through a $\lambda/4$ plate 215 and is converged appropriately by a relay lens 216 having a focus actuator 230, and then passes through an objective lens 217 and is reflected by a riser mirror 218, and is radiated onto the optical disk thereafter through an objective lens 219. The optical head 210 shown in FIG. 14B includes the optical sensor 221 provided with light permeability in place of the polarizing prism 214 and a relay lens 216 provided with no focus actuator 230.

Figure 15:
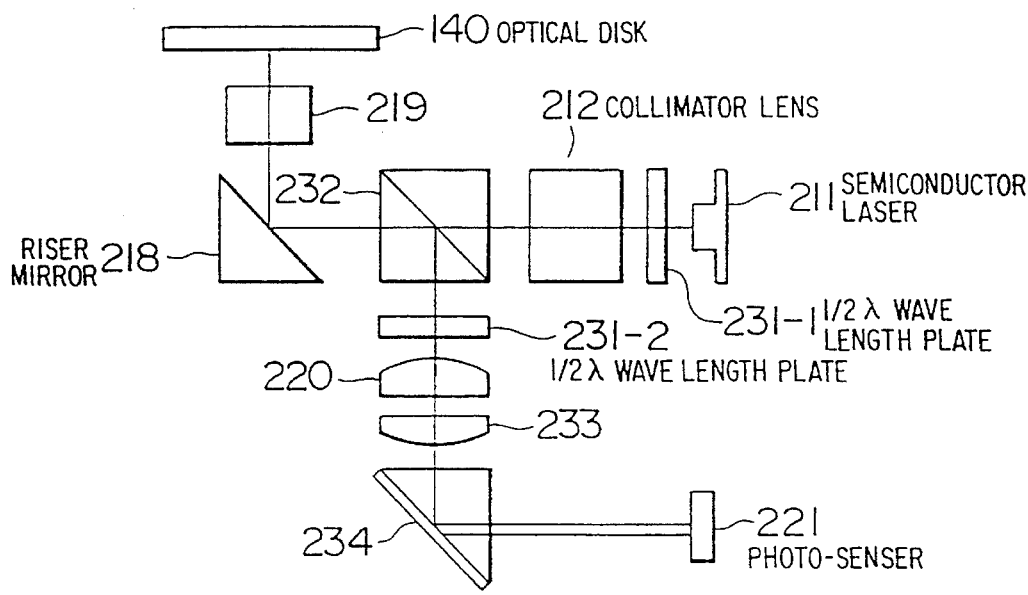
FIG. 15 is a composition diagram showing still another embodiment of the optical head for a magneto-optical disk.

In FIG. 2A, FIG. 2B, FIG. 2C, FIG. 2D and FIG. 3, the optical head 210 may be realized with the optical system shown in FIG. 15. A divergent luminous flux emitted from a semiconductor laser 211 passes through a beam splitter (hereafter abbreviated as BS) 232 through a $\lambda/2$ plate 231-1 and a collimator lens 212 and becomes parallel luminous fluxes. The parallel luminous fluxes are reflected further by the riser mirror 218, and converted thereafter into parallel fluxes again by the objective lens 219 and radiated onto the optical disk 140. On the other hand, the luminous flux passes through a $\lambda/2$ plate 231-2 after reflected by the BS 232, and is incident to a detection lens 220 consisting of a combination of a convex lens and a concave lens so as to become a convergent luminous flux. The convergent luminous flux is incident to a cylindrical lens 233, thus producing astigmatism. The luminous flux which has passed the cylindrical lens 233 is incident to a micro BPS 234 which is an analyzer. This micro BPS 234 is composed of a parallelogram prism and transparent parallel flat plates putting a polarizing film which transmits P-polarized light (polarized light in a vibration direction parallel with the paper surface) and reflects S-polarized light (polarized light in a vibration direction perpendicular to the paper surface) therebetween. The convergent luminous flux is incident to the polarizing film from the upper side of the parallelogram prism. The P-polarized light which has transmitted through the polarizing film is totally reflected by the back plane of the parallel flat plates and passes through the polarizing film again, and then advances toward the left side of the parallelogram prism. On the other hand, the s-polarized light reflected by the polarizing film also advances in the same direction as the P-polarized light, and is incident to the optical sensor 221 at a certain interval. This interval is controlled by means of the parallel flat plates.

Figure 16:
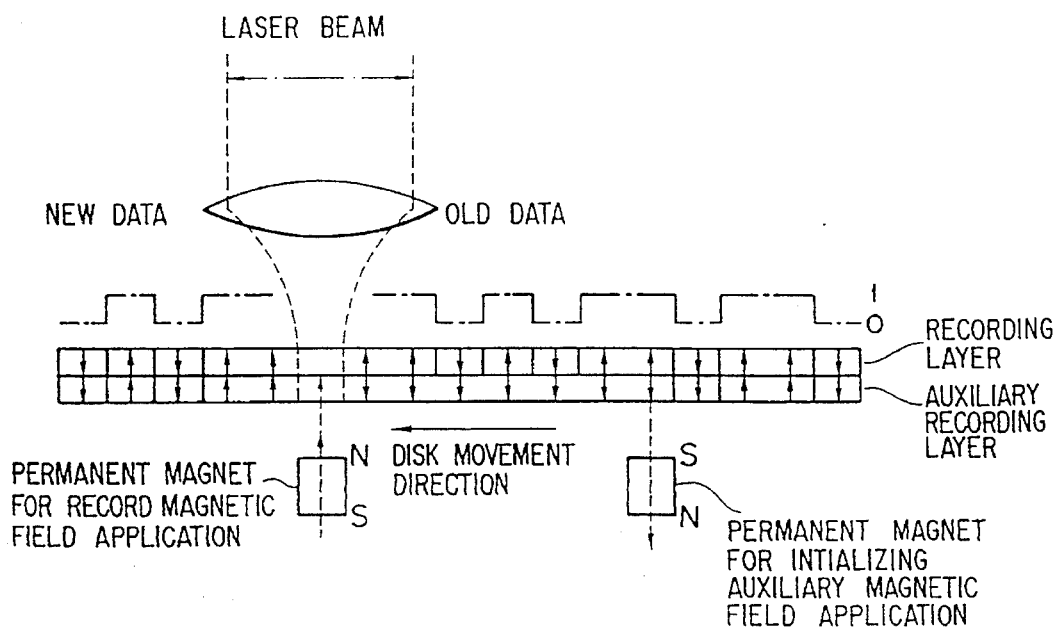
FIG. 16 is an explanatory diagram of principles of initialization, write, read and overwrite of a magneto-optical disk.

FIG. 16 shows the principle of overwriting a magneto-optical disk by laser power modulation. A write medium best suited for realizing the present invention will be explained with this principle. As shown in FIG. 6, the optical recording medium has a two-layer structure of the recording layer and the auxiliary recording layer, in which the recording layer on the side applied with a laser beam is composed of TbFe which has a large coercive force Hc and a low curie temperature and the auxiliary recording layer is composed of GdTbFe which has a small coercive force Hc and a high curie temperature. Besides, the permanent magnet for applying initializing auxiliary magnetic field is made to generate a magnetic field stronger than that of the permanent magnet for applying recording magnetic field. First, magnetization of the auxiliary recording layer having small Hc is oriented in a magnetizing direction in the permanent magnet for applying initializing auxiliary magnetic field. At this time, since magnetization of the recording layer has coercive force larger than that of the permanent magnet for applying initializing auxiliary magnetic field, the magnetizing direction is not reversed. When the recording medium reaches a position where the laser beam is applied under the above-mentioned state, magnetization of the auxiliary recording layer having a high curie temperature is preserved as is and only the recording layer reaches the curie temperature, and it is higher when the laser power is weak. Thus, the magnetization of the recording layer is oriented in the magnetizing direction of the auxiliary recording layer in the cooling process. On the other hand, since the auxiliary recording layer also reaches the curie temperature when the laser power is strong, the magnetization thereof is oriented in the direction of the magnetic field of the permanent magnet for applying recording magnetic field along with the recording layer. That is, since the magnetizing direction is determined by the difference in the intensity of the laser power, viz., modulation of the laser power, a process of erasing old written contents becomes unnecessary, thus making overwriting possible. Accordingly, it is required that the permanent magnet for applying recording magnetic field is positioned where the laser beam is applied. However, the permanent magnet for applying initializing auxiliary magnetic field does not need be placed at positions shown in FIG. 2D and FIG. 3, but may be placed at any position in the case or the recording area of the magneto-optical disk which does not overlap with the permanent magnet for applying recording magnetic field.

The optical recording medium is not limited to a $Tb_{21}Fe_{79}$ recording layer and a $Gd_{24}Tb_3Fe_{73}$ auxiliary recording layer so far as a two-layer structure of a recording layer having a large coercive force Hc and a low curie temperature and an auxiliary recording layer having a small coercive force Hc and a high curie temperature is formed. Further, a composition of a GdTbFeCo recording layer, a GdFeCo intermediate layer and a TbFeCo auxiliary recording layer which is a two-layer lamination having a third magnetic layer intermediately as a means for reducing magnetic wall energy at the interface may be used as well.

Since the permanent magnet such as SmCo and NdFeB used as a second magnetic field application means for recording in the recording layer is not transparent with respect to the wavelength of incident light as seen from the principle of overwriting it is required that the means for applying magnetic field for recording in the recording layer is self-contained in a case on the opposite side of the light incident portion and the disk. In FIG. 2D and FIG. 3, the first magnetic field application means for initializing the auxiliary recording layer is shown to be self-contained in the case on the opposite side of the light incident portion and the disk, but the first magnetic field application means for initializing the auxiliary recording layer may be self-contained in the case on the light incident side.

Figure 17:
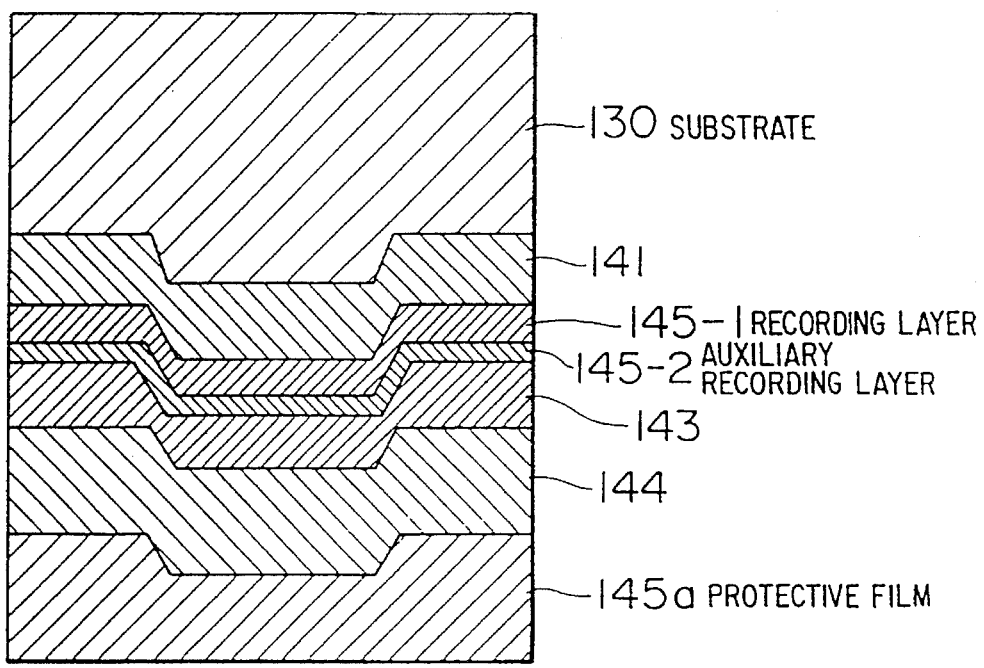
FIG. 17 and FIG. 18 are sectional views showing multilayer compositions of the magneto-optical disk.

FIG. 17 shows a film structure best suited to be used as a magneto-optical disk medium shown in FIG. 2D. The magneto-optical disk medium is composed of a light permeable substrate 130, a first light interference film 141 having a high refractive index characteristic, recording layer 145-1, an auxiliary recording layer 145-2, a second light interference film 143 having a high refractive index characteristic, a reflecting film 144 and a protective film 145a. In such an optical disk medium, light is incident from the substrate side. $Si_2N_4$, AlN, $Ta_2O_5$, ZnS and the like can be used as a dielectric film having a high refractive index. An example of a manufacturing method and performance will be shown. First, a first light interference film $Si_3N_4$ having a thickness of 100 nm, then a recording film $Tb_{20}Fe_{80}$ having a thickness of 100 nm, an auxiliary recording film $Gd_{24}Tb_5Fe_{71}$ having a thickness of 50 nm, a second light interference film $Si_3N$, having a thickness of 100 nm and an Au reflecting film having a thickness of 100 nm have been formed by applying a sputtering method to a glass substrate having a thickness of 0.5 mm and a diameter of 48 mm on which a groove having a depth of 100 nm and a pitch of 1.6 μm is formed in a spiral form. Furthermore, ultraviolet hardening resin having a thickness of 100 pm has been formed as a protective film thereon. This magneto-optical disk was attached to the transparent case shown in FIG. 2D, that is, a polycarbonate substrate having a thickness of 0.6 mm obtained by cutting a SmCo magnet having Hc at 40,000 e as the first magnetic field application means for initializing the auxiliary recording layer and a SmCo magnet 5 mm wide and 25 mm long having Hc at 3,000 e as the second magnetic field application means for recording in the recording layer out of a bulk. The performance of such a magneto-optical disk-in-card has been evaluated. The disk-in-card was rotated at the rotation speed of 3,000 rpm and tested by the laser modulation method at the time of overwriting shown in FIG. 13. That is, when 6.6 mW was set on the write film surface as the bias power and 8.9 mW was set on the recording film surface as the recording power and the overwrite test was executed while modulating the optical beam between 2 MHz and 3 MHz, C/N was obtained at 54 dB and the error generation factor was obtained at less than $10^{-5}$.

Figure 18:
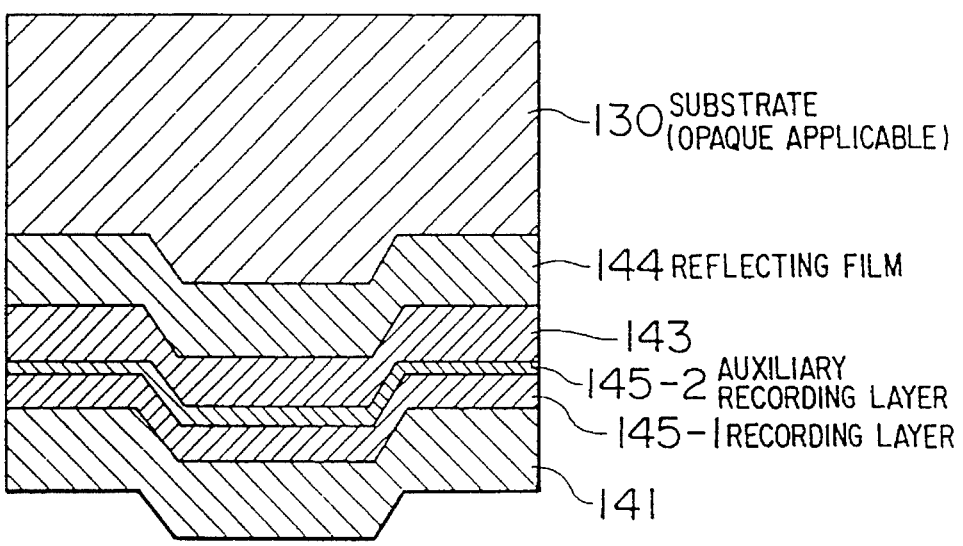

On the other hand, FIG. 18 shows a film structure best suited to be used as the magneto-optical disk medium shown in FIG. 3. In this case, a feature exists in that the order from the first light interference film 141 to the reflecting film 144 is reversed because the laser beam is incident from the protective film. Here, the interference film fulfills the functions of improvement of contrast by means of interference of light and the control film of heat conduction characteristic. Besides, in this case, since the light incident side is not on the substrate side, it is possible to form the same film composition as that shown in FIG. 18 on the opposite side of the substrate, thereby using both sides of one sheet of substrate. An example of a manufacturing method and performance is shown. First, an Au reflecting film having a thickness of 100 nm, a second light interference film AlN having a thickness of 100 nm, an auxiliary recording layer $Tb_{24}Fe_{65}Co_{11}$ having a thickness of 100 nm, a recording film $Gd_{24}Tb_3Fe_{73}$ having a thickness of 50 nm and a first light interference film $Si_3N_4$ having a thickness of 100 nm have been formed by applying a sputtering method to a stainless steel substrate being 0.5 mm thick and 48 mm in diameter on which a groove having 100 nm in depth and 1.6 μm in pitch is formed in a spiral form. Furthermore, ultraviolet hardening resin having a thickness of 100 μm has been formed as a protective film thereon. This magneto-optical disk was attached to the transparent case shown in FIG. 3, that is, a polycarbonate substrate having a thickness of 0.6 mm obtained by cutting a SmCo magnet having Hc at 40,000 e as the first magnetic field application means for initializing the auxiliary recording layer and a SmCo magnet 5 mm wide and 25 mm long having Hc at 3,000 e as the second magnetic field application means for recording in the recording layer out of a bulk. The performance of such a magneto-optical disk-in-card has been evaluated. When the disk-in-card was rotated at the rotation speed of 3,600 rpm, 6.6 mW was set on the recording film surface as the bias power and 8.9 mW was set on the recording film surface as the write power and overwrite test was executed while modulating the optical beam between 2 MHz and 3 MHz, C/N was obtained at 54 dB and the error generation factor was obtained at less than $10^{-5}$.

Figure 19:
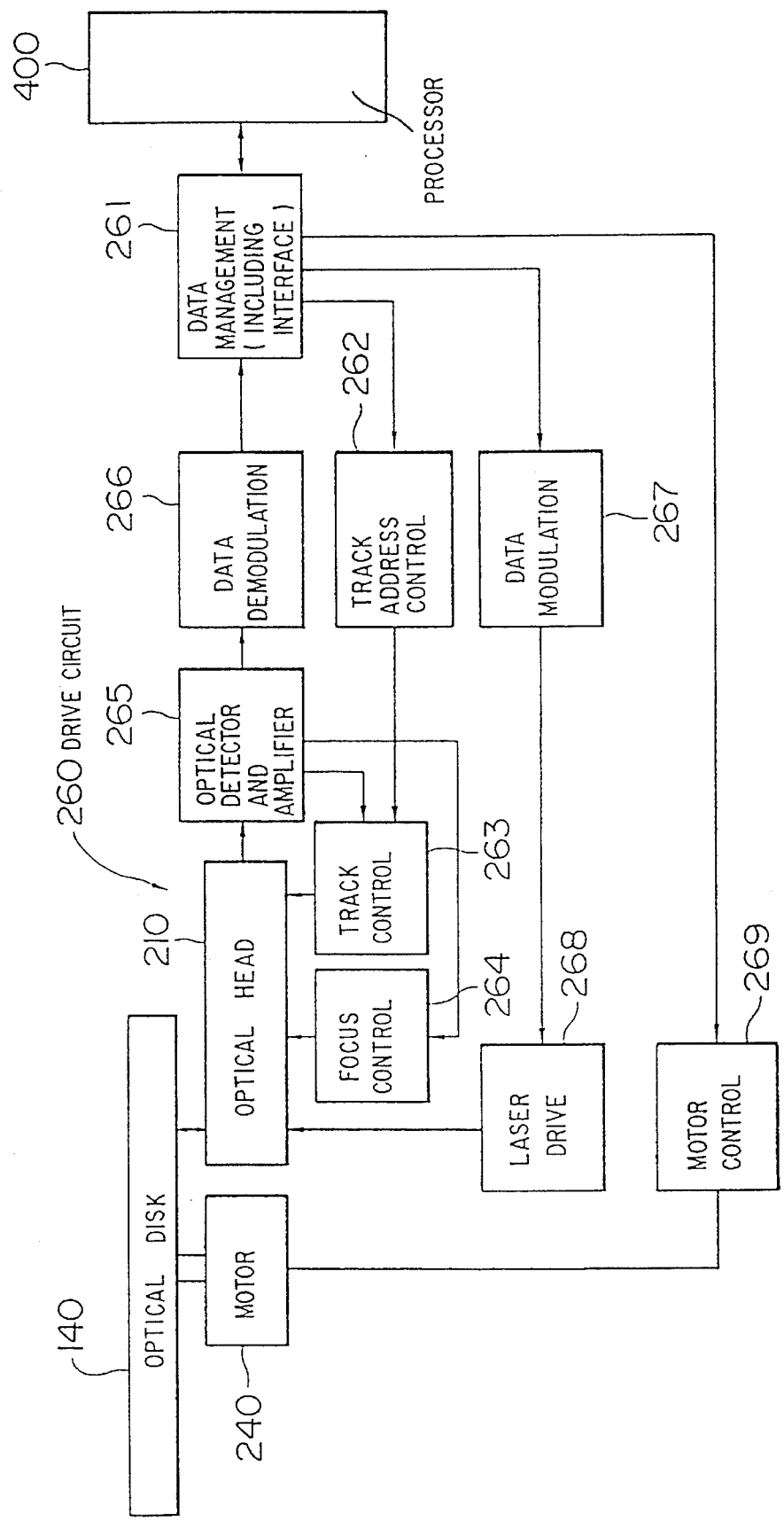
FIG. 19 is a block diagram showing an embodiment of a drive circuit system.

An optical disk drive circuit system 260 is explained in detail in FIG. 19. The optical disk drive circuit system 260 is composed of a data magnetic portion 261, a track address control portion 262, a track control portion 263, a focus control portion 264, a photo detector and amplifier 265, a data demodulation portion 266, a data modulation portion 267, a laser drive 268 and a motor control portion 269. With such a composition, at the time of overwriting, a track address to be written is determined in the track address control portion 262, and the data modulation portion 267 converts the data given from a processor 400 into "0" and "1" pattern to be recorded on the optical disk by a modulation system. The modulation system includes 2–7 modulation and 4–15 modulation, which, however, are used properly depending on the system. In the laser drive 268, the laser power is modulated between the bias power and the writing power as shown in FIG. 13 in accordance with the "0" and "1" pattern determined by the data modulation portion 267. Further, at the time of reading data, a track address designated by the processor 400 is selected, the laser power is set at a constant value of approximately 1 to 2 mW, the reflectance of the optical disk or the karr rotation of the magneto-optical disk 140 is read by the photo detector and amplifier 265, and the data are demodulated by the data demodulation portion 266. Further, the result of the photo detector and amplifier 265 may be utilized as the signal of the track control portion 263 and the focus control portion 264, but the functions of these portions can be realized with the functions which have been heretofore employed in a compact disk and an optical disk device. Further, the motor control portion 269 controls the number of rotation of a motor 240 for rotating the optical disk 140. There are CAV (Constant Angular Velocity) type and CLV (Constant Linear Velocity) type for the control of the number of rotation.

In another embodiment of an optical or magneto-optical disk-in-card of the present invention, a means for rotating the disk is self-contained in the card. With this, it is possible to make the thickness of the whole information processor thinner by the portion of the motor.

Figure 20:
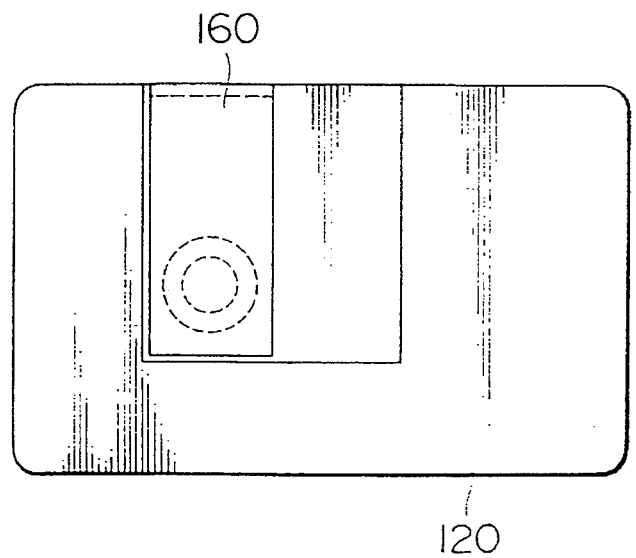
FIG. 20 is a plan view showing another magneto-optical disk-in-card.

FIG. 20 shows another embodiment of the disk-in-card 100. The basic composition is the same as the composition shown in FIG. 4, and the light incident portion is covered with a transparent protective case, but the feature of the embodiment shown in FIG. 20 exists in that a protective cover 160 is provided. Since the disk-in-card 100 of the present invention is carried freely, the card case 120 is flawed sometimes. There is no operative problem if parts other than the light incident portion are flawed, but the card case needs to be replaced sometimes if the light incident portion is flawed. It is an object of the present invention to reduce the frequency of replacement of the card case. That is, by providing the protective cover 160 on the card case 120, frequent damage to the light incident portion is prevented, and incidence of light is made free by opening the protective cover 160 when the optical disk-in-card is inserted into the optical disk drive 200.

Figures 21A, 21B:
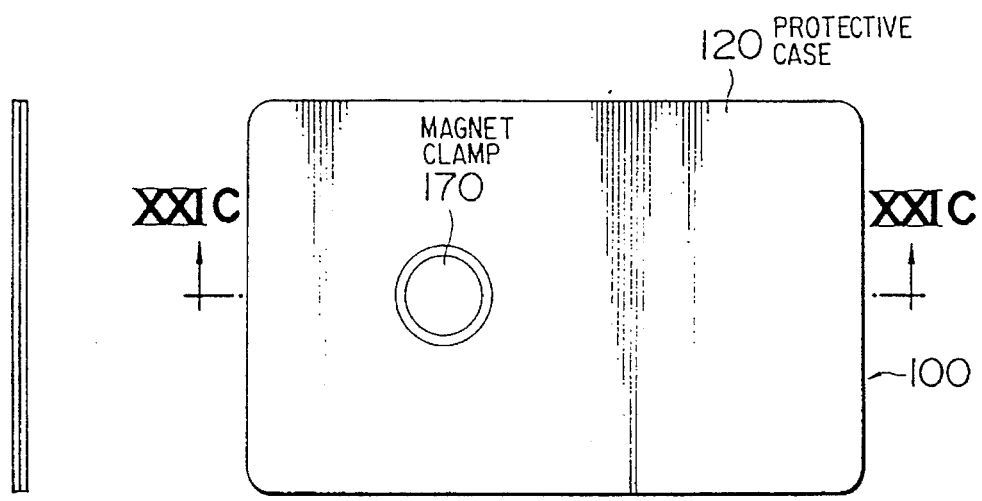
FIG. 21A is a plan view showing another embodiment of the optical disk-in-card.
FIG. 21B and FIG. 21C are respective side views of the optical disk-in-card shown in FIG. 21A.
Figure 21C:
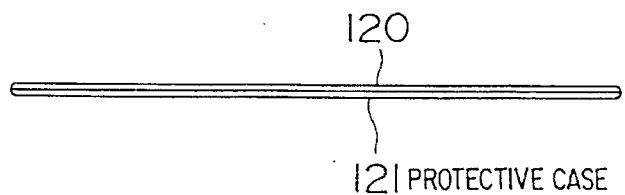
Figure 22A:
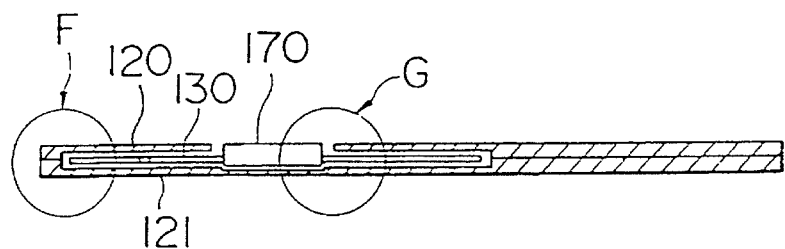
FIG. 22A is a sectional view of an optical disk-in-card taken along arrow marks XXIC—XXIC in FIG. 21A.
Figure 22B:
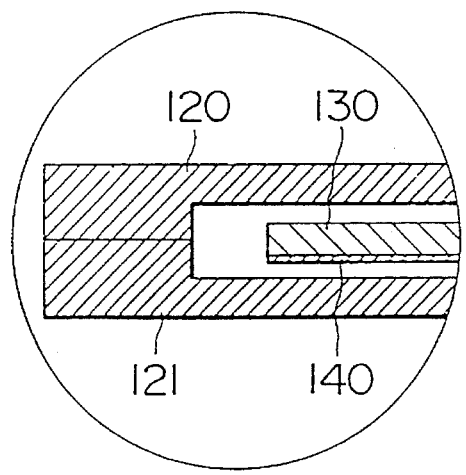
FIG. 22B is an enlarged sectional view shown with an arrow mark F in FIG. 22A.
Figure 22C:
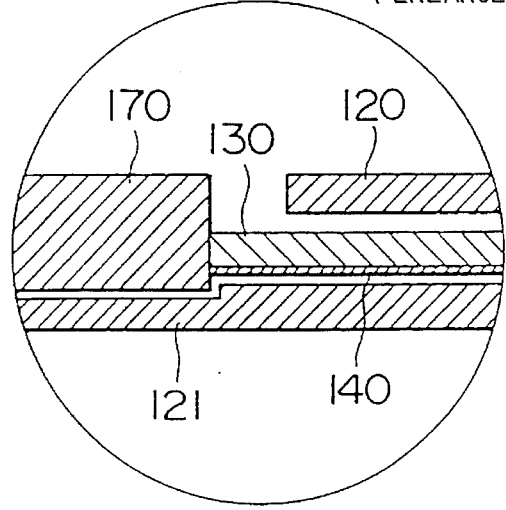
FIG. 22C is an enlarged sectional view shown with an arrow mark G in FIG. 22A.
Figure 23A:
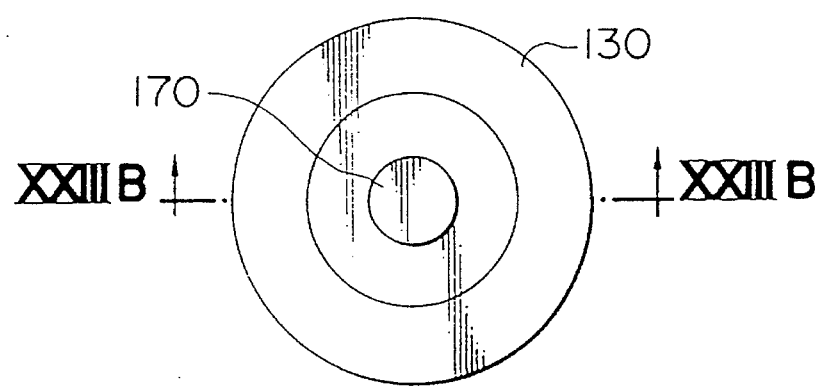
FIG. 23A is a plan view of another optical disk.
Figure 23B:
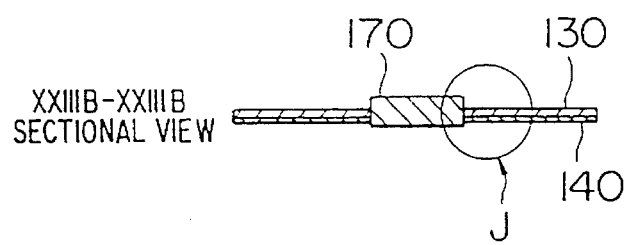
FIG. 23B is a sectional view taken along arrow marks XXIIIB—XXIIIB in FIG. 23A.

FIG. 21A, FIG. 21B and FIG. 21C show still another embodiment of the optical disk-in-card 100. Transparent protective plates 120 and 121 each have a film thickness of approximately 0.5 to 1.2 mm and the optical disk 140 (not shown) is inserted between these protective plates 120 and 121. Further, 170 indicates a magnet clamp for fixing the optical disk 140 to the rotary shaft for rotating the optical disk. FIG. 22A is a sectional view taken along arrow marks XXIC—XXIC shown in FIG. 21A, and FIG. 22B and FIG. 22C are enlarged views shown with arrow marks F and G shown in FIG. 22A. The optical disk 140 is fixed with the magnet clamp 170 and is apart from the protective plates 120 and 121. Under the state that the optical disk 140 is rotating, the optical disk 140 and the substrate 130 are under floating states from the protective plates 120 and 121. FIG. 23A and FIG. 23B show an example of the optical disk in this disk-in-card 100. The central part of the disk is hollow in the example shown in FIG. 5B, whereas the example shown in FIG. 23B has a feature that the disk is fixed with the magnet clamp 170 at the central part thereof.

Figure 24:
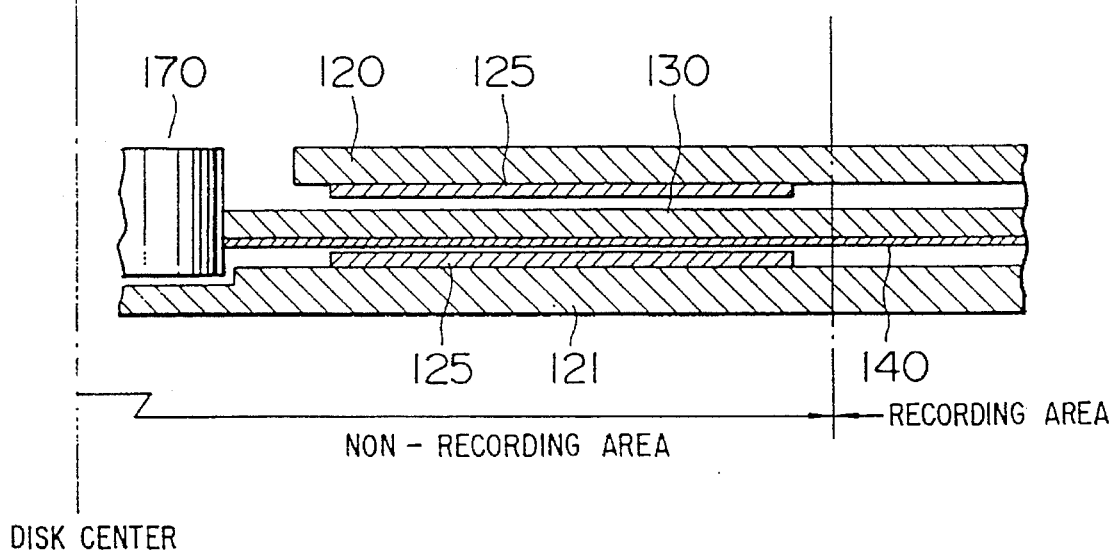

FIG. 24 is an enlarged view shown with an arrow mark J in FIG. 23B and shows a preventive method for preventing a mixture of dust and dirt from entering into the recording area. According to the present invention, the light incident portion is covered with a transparent protective cover. Therefore, dust and dirt will never get directly into the recording area, but the central part of the disk is open for the purpose of rotation, thus it is possible that dust and dirt mix in through this central part. Accordingly, in the present invention, a dust protective mat 125 is laid in a nonrecording area so as to prevent mixing of dust and dirt from the central part of the disk. An example in which a magnet clamp is utilized was explained with reference to FIG. 24, however, it is a matter of course that this dust protective mat is applicable to the example shown in FIG. 2.

FIG. 25 shows another example of a countermeasure against dust corresponding to FIG. 24. In the example shown in FIG. 24, there was a fear that dust and dirt mix in because the central part of the disk was open. Whereas, the present embodiment has a feature that a bearing 126 is provided at the Central part of the disk so as to delete the opened part.

FIG. 26A, FIG. 26B, FIG. 26C and FIG. 26D show another embodiment related to the card configuration. In above-described embodiment, a case that the card configuration has an equivalent configuration to a credit card has been described, but any configuration may be applied so far as the size thereof may contain the optical disk. FIG. 26A shows an embodiment of a substantially square card having a protective cover 160. Besides, the size of the optical disk has been shown at approximately 50 mm in the present invention but the size may be altered as needed. That is, the present invention is applicable to any size such as 12 inches, 8 inches, 5.25 inches, 5 inches and 3.5 inches which have been heretofore developed.

FIG. 27 shows another embodiment of the magneto-optical disk-in-card 100 for realizing the present invention. The basic composition is the same as the composition shown in FIG. 2A and the light incident portion is covered with a transparent protective case, but the feature of the embodiment shown in FIG. 27 exists in that a protective cover 160 is further provided. Besides, the permanent magnet for initializing the auxiliary recording layer of the recording medium and the permanent magnet for recording in the recording layer are in the protective case. Since the magneto-optical disk-in-card 100 of the present invention is carried freely, the card 120 is flawed sometimes. There is no problem if parts other that the light incident portion are flawed, but the card case needs to be replaced sometimes if the light incident portion is flawed. It is an object of the present invention to reduce the frequency of replacement of the card case. That is, by providing the protective cover 160 on the card case 120, frequent damage to the light incident portion is prevented, and incidence of light is made free by opening the protective cover 160 when the magneto-optical disk memory card is inserted into the optical disk drive 200.

Figure 29A:
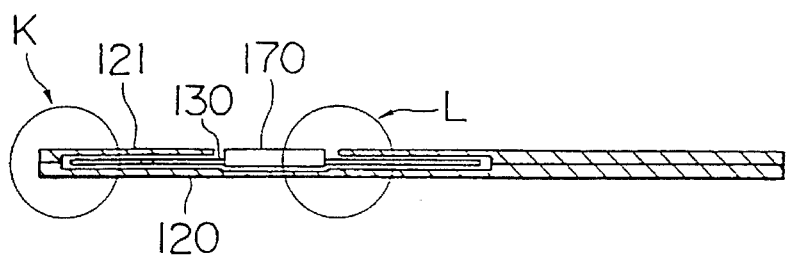
FIG. 29A is a sectional view taken along arrow marks XXVIIIC—XXVIIIC shown in FIG. 28A.
Figure 29B:
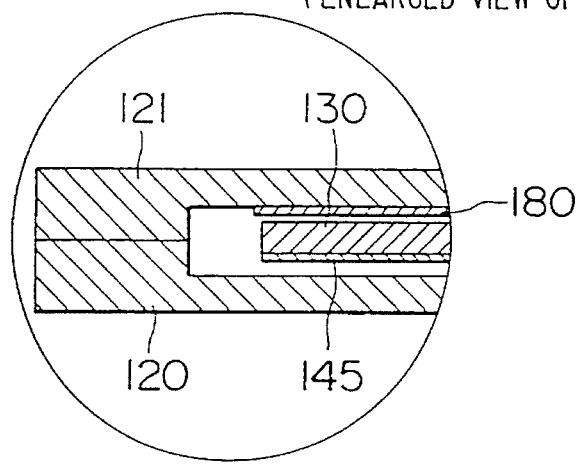
FIG. 29B is an enlarged sectional view shown with an arrow mark K in FIG. 29A.
Figure 29C:
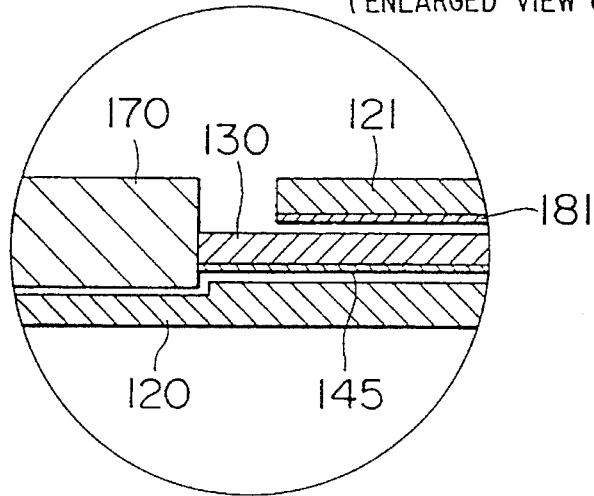
FIG. 29C is an enlarged sectional view shown with an arrow mark L in FIG. 29A.

FIG. 28A, FIG. 28B and FIG. 28C show another embodiment of the magneto-optical disk-in-card 100. FIG. 28A shows the external appearance of a magneto-optical disk of a card size attached with the transparent protective case 120 and the protective case 121. The permanent magnet 181 for initializing magnetic field and a permanent magnet 180 for recording magnetic field are fitted to the protective case 121. The transparent protective cases 120 and 121 have a film thickness of approximately 0.5 to 1.2 mm, respectively, and the magneto-optical disk 140 (not shown) is inserted between these protective cases 120 and 121. Besides, 170 indicates the magnet clamp which fixed the magneto-optical disk 140 to a rotary shaft for rotation, FIG. 29A shows a sectional structure of the magneto-optical disk in FIG. 28A shown along arrow marks XXVIIIC—XXVIIIC. The magneto-optical disk 140 is fixed by the magnet clamp 170 and is apart from the protective case 120, 121. Further, FIG. 29B and FIG. 29C are enlarged views showing the parts shown with arrow marks K and L in FIG. 29A in more details. Under the state that the magneto-optical disk 140 is rotating, the magneto-optical disk 140 and the substrate 130 are under floating states from the protective case 120, 121. FIG. 30 shows another embodiment corresponding to FIG. 29C, which shows an example of a magneto-optical disk in the magneto-optical disk-in-card 100. The central part of the disk in hollow in the example shown in FIG. 5B, whereas the example shown in FIG. 30 has a feature that the disk is fixed with the magnet clamp 170 at the central part thereof.

FIG. 30 shows a preventive method for preventing a mixture of dust and dirt from entering into the recording. According to the present invention, the light incident portion is covered with a transparent protective cover. Therefore, dust and dirt will never get directly into the recording area, but the central part of the disk is open for the purpose of rotation, thus it is possible that dust and dirt mix in through this central part. Accordingly, in the present invention, a dust protective mat 125 is laid in a non-recording area so as to prevent mixing of dust and dirt from the central part of the disk. An example in which a magnet clamp is utilized was explained with reference to FIG. 30, however, it is a matter of course that this dust protective mat is applicable to the examples shown in FIG. 2D and FIG. 3.

FIG. 31 shows another example of a countermeasure against dust. In the example shown in FIG. 30, there was a fear that dust and dirt mix in because the central part of the disk was open. Whereas, the present embodiment has a feature that a bearing 126 is provided at the central part of the disk so as to delete the opened part.

FIG. 32A, FIG. 32B, FIG. 32C and FIG. 32D show another embodiment related to the card configuration. In above-described embodiment, a case that the card configuration has an equivalent configuration to a credit card has been described, but any configuration may be applied so far as the size thereof may contain the magneto-optical disk. FIG. 32A shows an embodiment of a substantially square card. Besides, the size of the optical disk has been shown at approximately 50 mm in the present invention, but the size may be altered. That is, the present invention is applicable to any size such as 12 inches, 8 inches, 5.25 inches, 5 inches and 3.5 inches which have been heretofore developed.

FIG. 33 shows an embodiment in case the present invention is applied to a lap top computer. This embodiment is composed of a lap top computer 400 including a processor unit 401 and a semiconductor main memory 402, and a keyboard 410 and a display 423 are connected thereto through a system bus 403, but the feature of the present invention exists in that an optical or magneto-optical disk-in-card drive 200 is connected through an optical or magneto-optical disk-in-card interface 404. The optical or magneto-optical disk-in-card 100 of the present invention has a capacity wave than 10 MB in spite of the small size, having the overall size of approximately 50 mm. With this, large scale arithmetic processing of a minicomputer is made possible on a lap top computer. Further, it is detachable from the optical or magneto-optical disk-in-card drive 200, thus providing a system convenient for portable transportation.

Figure 34:
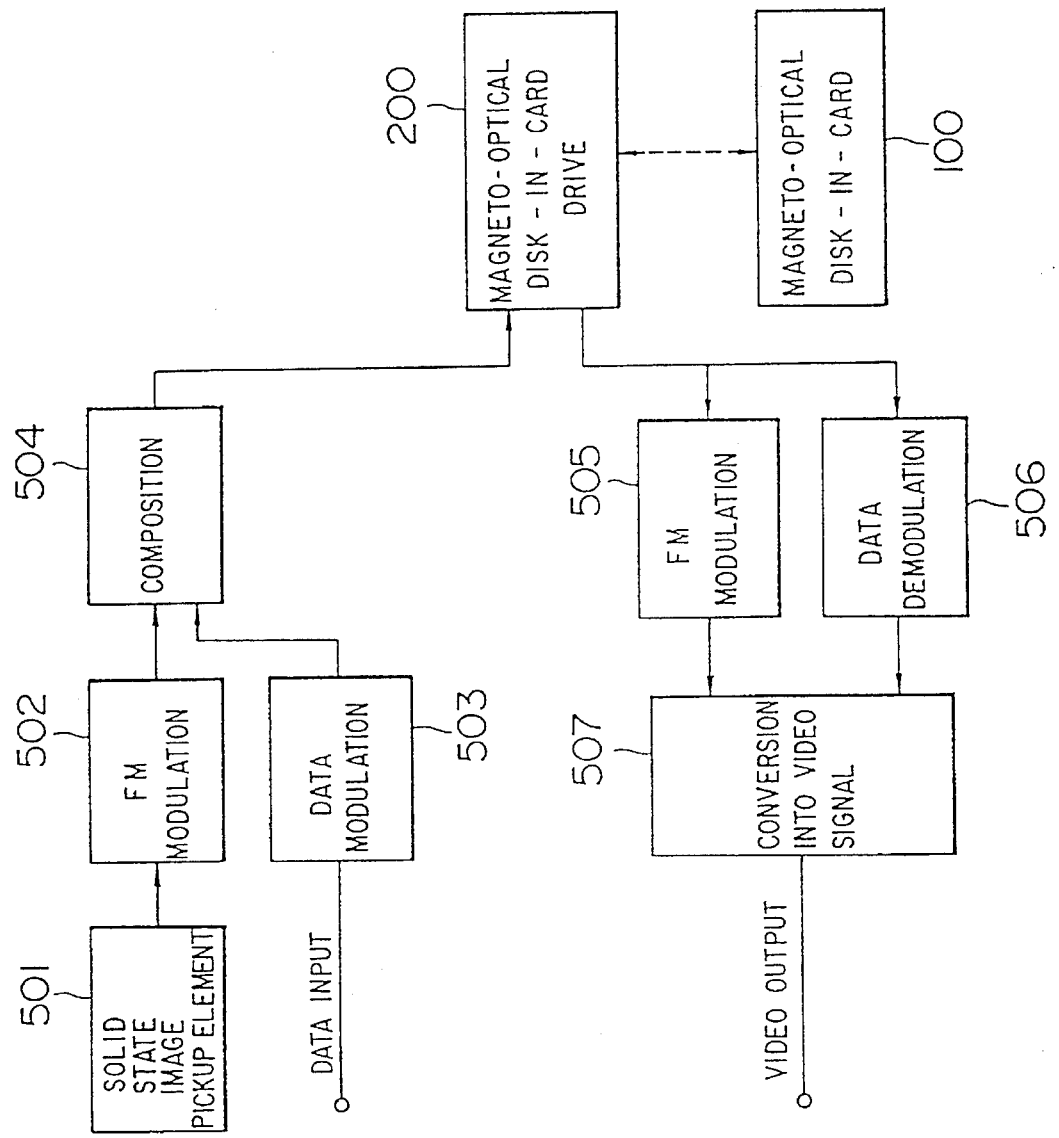
FIG. 34 is a block diagram showing a composition in case, the optical disk-in-card is applied to a camera.

FIG. 34 shows an embodiment when the present invention is applied to a camera. Signal processing of an electronic camera utilizing a floppy disk can be utilized for basic signal processing thereof. Signal processing of an electronic camera consists of an FM modulation element of a pictureimage, a modulation element of data such as data, a recording portion into a floppy disk and a video signal read portion as described in the Nikkei Electronics, Dec. 12, 1938, pp. 195–201. The feature of the present invention exists in that the optical or magneto-optical disk-in-card 100 is utilized as the recording medium of a signal. The optical or magneto-optical disk-in-card 100 of the present invention not only has a large capacity, but also is easy for handling and highly reliable because the optical disk is self-contained in a transparent protective case.

Concrete operation will be explained with reference to FIG. 34. In the figure, an electric signal, converted photoelectrically by a solid state image pickup element 501 of a CCD or a MOS, is FM-modulated. On the other hand, the data are converted by a differential phase shift keying (DPSK) system and the like, synthesized with FM modulation (block 504) and recorded in the optical or magneto-optical disk-in-card 100 through the optical or magneto-optical disk-in-card drive 200. On the other hand, at the time of reading, the picture image is demodulated by an FM demodulator 505 and the data are demodulated by a data demodulator 506, and both are converted into video signals such as N9SC by means of a converter 507 into video signals.

Figure 35:
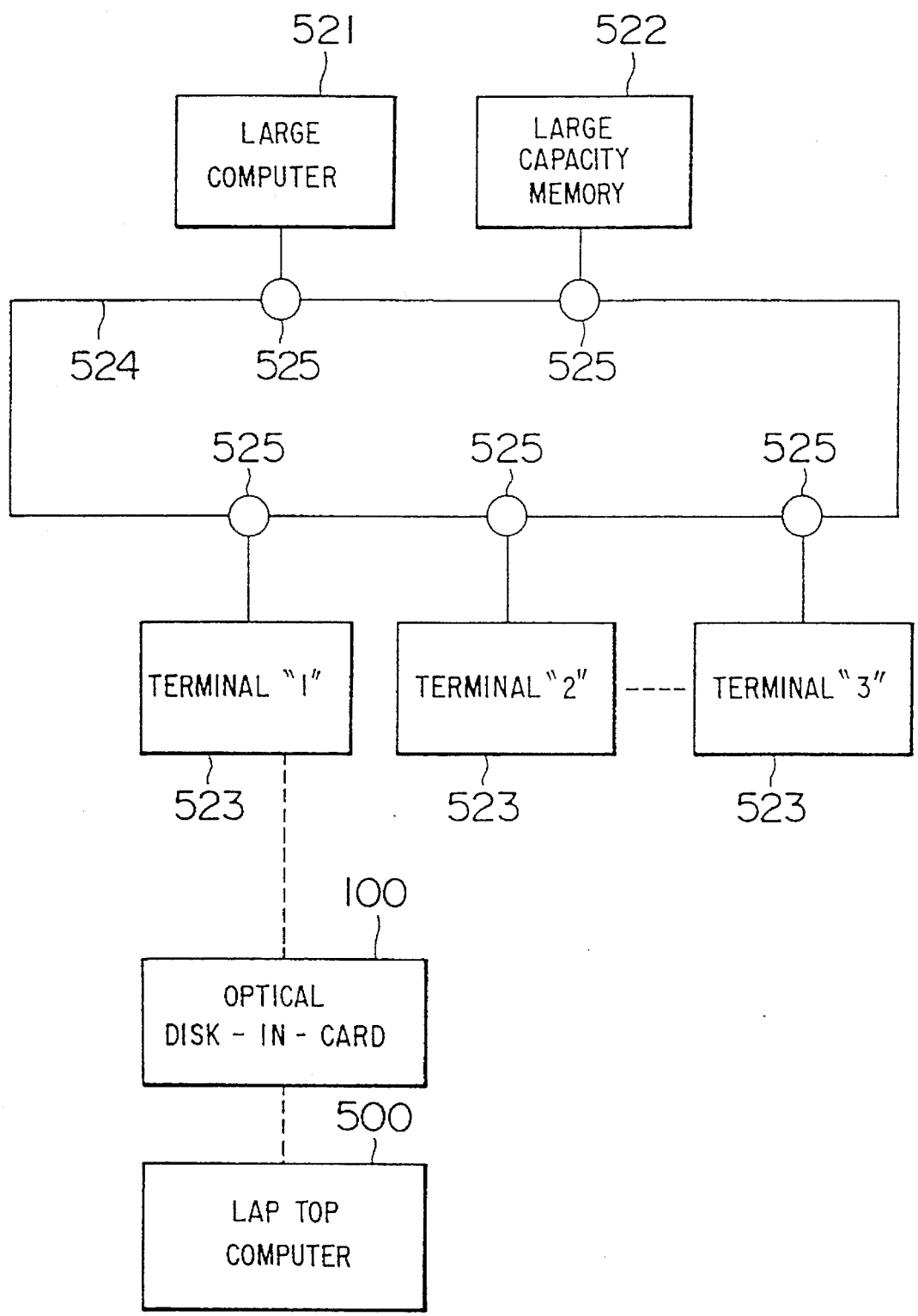
FIG. 35 is a block diagram showing a composition in case, the optical disk-in-card is applied as a memory for a terminal of a large computer and an interface of a lap top computer.

FIG. 35 shows an example in which the optical or magneto-optical disk-in-card 100 is utilized as an interface between a lap top computer 500 and a terminal 523 of a large computer 521. In the figure, the large computer 521 has a memory 522 of a large capacity such as an ordinary magnetic disk, and is connected with a plurality of terminals 523 through a network 524 and stations 525 for utilization.

However, there has been a problem that such a system cannot be utilized where there is no terminal. According to the present invention which has been made to solve such a problem, an optical or magneto-optical disk-in-card 100 of the present invention is used in a lap top computer 500 and the optical or magneto-optical disk-in-card 100 of the present invention is also used as a memory of the terminal 523 of the large computer. By using the optical or magneto-optical disk-in-card 100 in common as the memory of the lap top computer 500 and the terminal 523 of the large computer in a manner as described above, it is possible to proceed with a work of creating a program and debugging at home or in an electric car where the terminal is not available.

Figure 36:
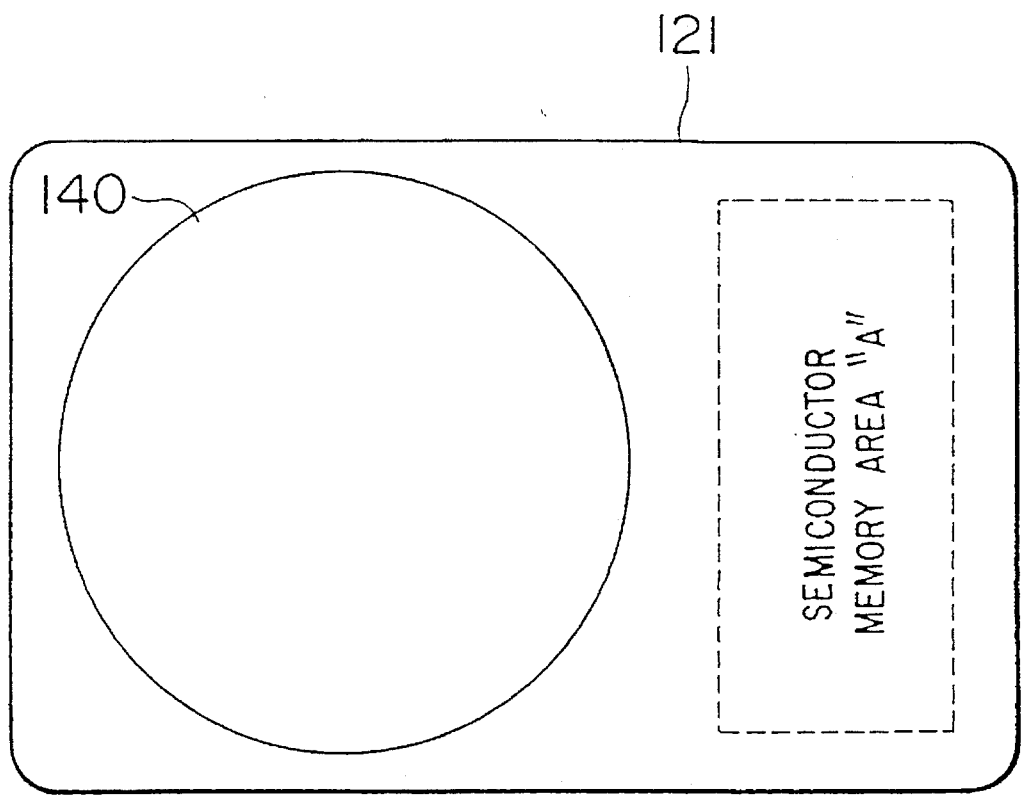
FIG. 36 is a plan view showing another embodiment of the optical disk-in-card.

FIG. 36 shows an application example of the optical or magneto-optical disk-in-card 100 when security is demanded of the memory. Although the optical or magneto-optical disk 140 has a feature of a large capacity, it is possible to check what type of pattern has been written with a microscope having a high enlargement ratio. It is not only possible to ensure security by utilizing a random number code and the like, but also to ensure higher security by providing a semiconductor memory on the card. In this case, it can be achieved by providing a semiconductor memory area "A" as shown in FIG. 36. If high security can be achieved as described above, this optical or magneto-optical disk memory card 100 can be utilized as cash cards and for information requiring secrecy such as in a portable personal medical medium data base. In this case, it can be materialized with the hardware composition shown in FIG. 1.

Figure 37:
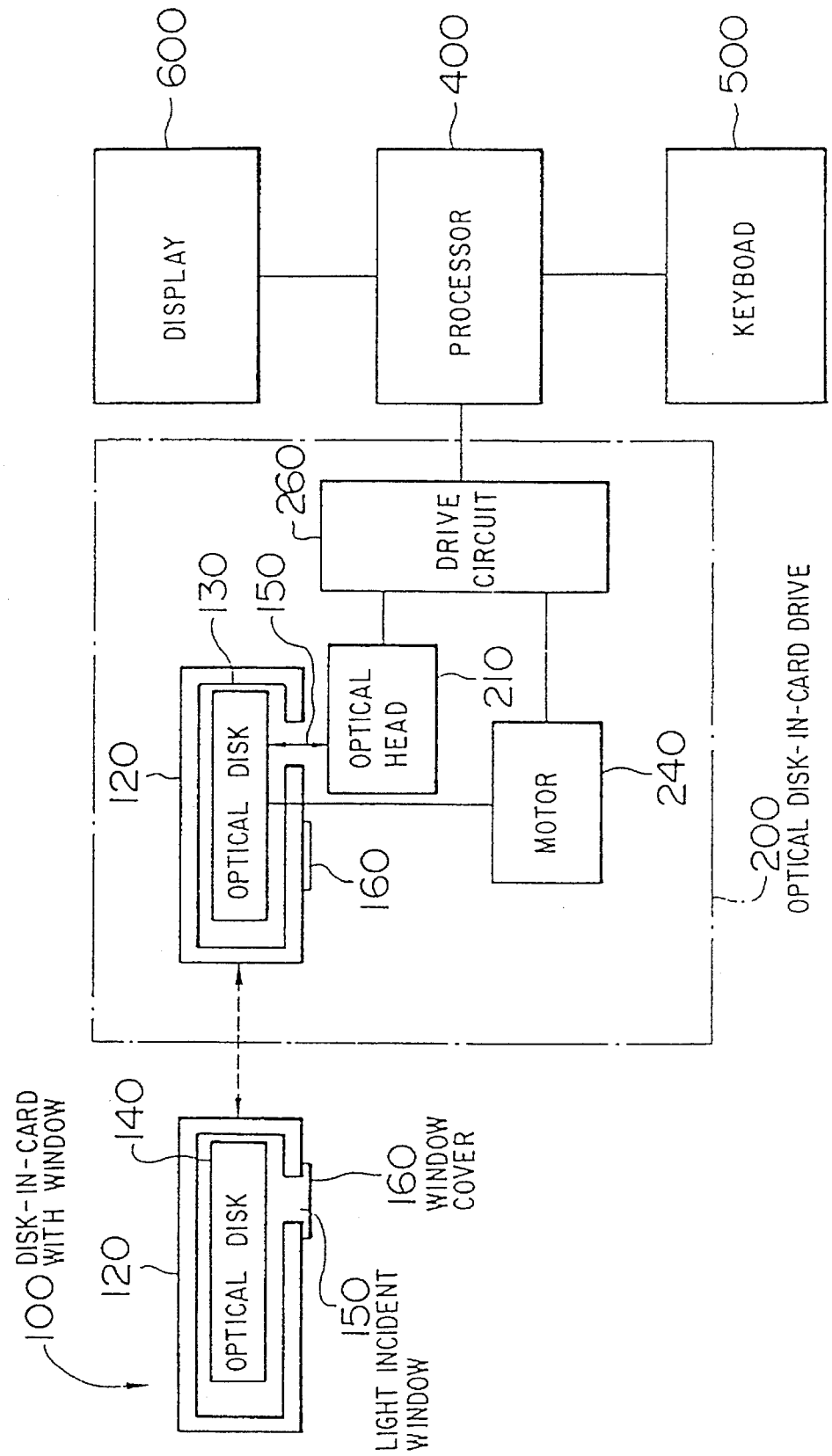
FIG. 37 is a block diagram showing another device composition of the present invention.

An embodiment of the present invention will be explained hereafter with reference to FIG. 37. FIG. 37 shows a conceptual diagram of an optical or magneto-optical disk-in-card memory of the present invention. The optical or magneto-optical disk memory of the present invention is composed of an optical or magneto-optical disk 100 in 50 mmø incorporated in a protective case of a card size, a disk drive 200 for the optical or magneto-optical disk-in-card, a processor 400, and input means 500 and an output means 600. The optical or magneto-optical disk-in-card 100 is composed of an optical disk 140, a light incident window 150, a card case 120 and a window cover 160, and is detachable from a disk drive 200. Further, the disk drive 200 is composed of a write/read/erase optical head 210, a motor 240 for rotating the optical disk 140 and a drive circuit 260 for controlling the optical head 210 and the motor 240, and the light incident cover 150 is opened automatically so that light may be incident when the optical or magneto-optical disk-in-card 100 is set. The drive circuit 260 controls the number of rotations of the motor 240 and also fulfills the functions of modulation and demodulation for reading of write/erase data by the command from the processor 400. Further, the processor 400 executes arithmetic processing or write/read to the optical disk in accordance with the command from the input means 500, and also outputs the contents of the memory of the optical disk 140 or operation results through the output means 600 as occasion demands.

Figure 38:
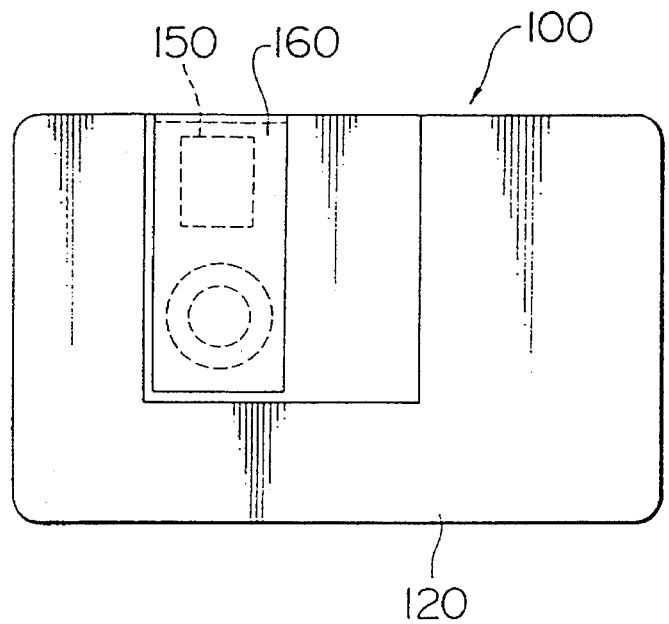
FIG. 38 is a plan view showing another embodiment of the optical disk-in-card.
Figure 39A:
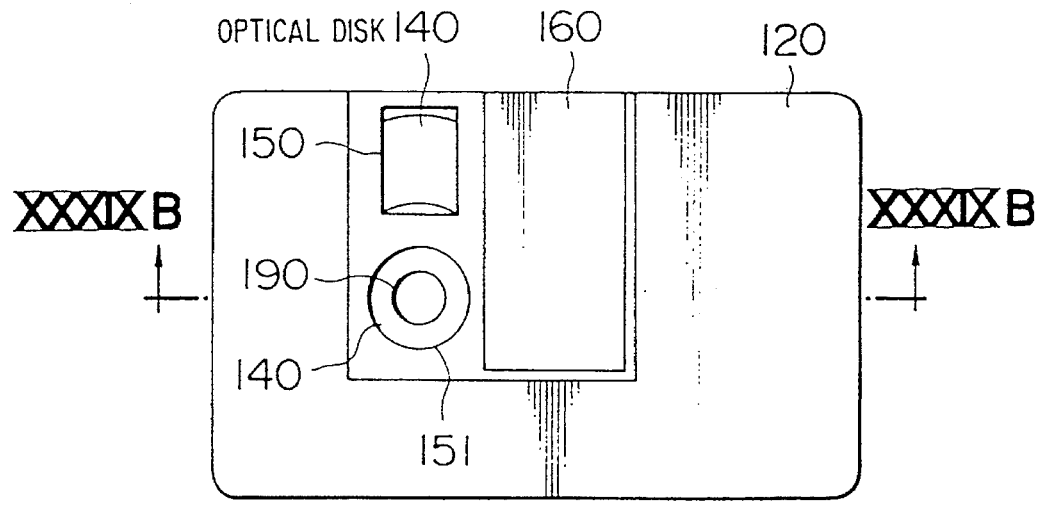
FIG. 39A is a plan view showing still another embodiment of the optical disk-in-card.
Figure 39B:
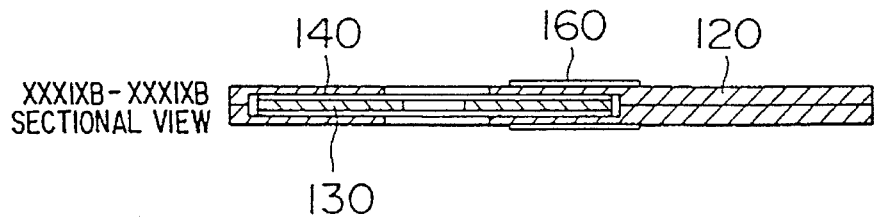
FIG. 39B is a sectional view taken along arrow marks XXXIXB—XXXIXB in FIG. 39A.

FIG. 38 shows an embodiment of optical disk-in-card 100 best suited for realizing the present invention. As shown in the figure, the optical disk medium 140 is incorporated in a protective case 120, 121 of a card size in the present optical disk-in-card 100. Further, in the protective cases, a window 150 is provided for another incidence of light, and the optical disk is usually covered with a cover 160. Here, when the optical disk-in-card 100 is set to the drive 200, the window cover 160 of the protective case is opened and light is made incident directly to the substrate of the optical disk, and a magnetic field generating means is used while allowing it to come near to the optical disk in the case of a magneto-optical disk. FIG. 39A and FIG. 39B show an external appearance of the optical disk-in-card 100 when the window cover 160 is opened. When the window cover 160 is opened, the optical disk 140 is exposed, and the optical head is able to make access directly to the optical disk.

Figure 40B:
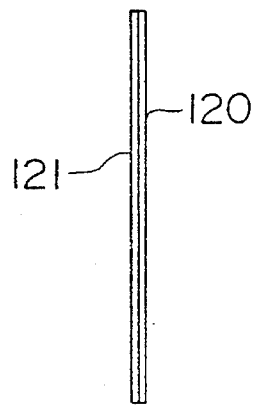
FIG. 40B and FIG. 40C are respective side views of the optical disk-in-card shown in FIG. 40A.
Figure 40A:
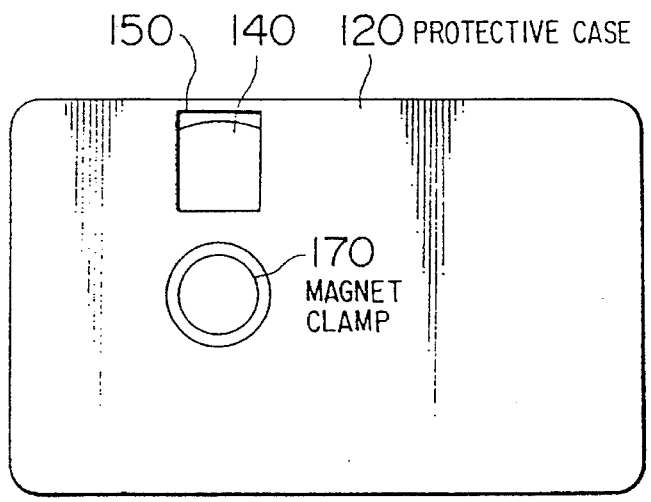
FIG. 40A is a plan view showing another embodiment of the optical disk-in-card.
Figure 40C:
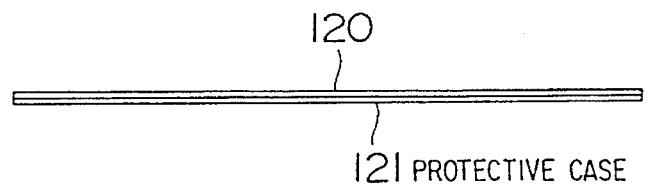
Figure 41:
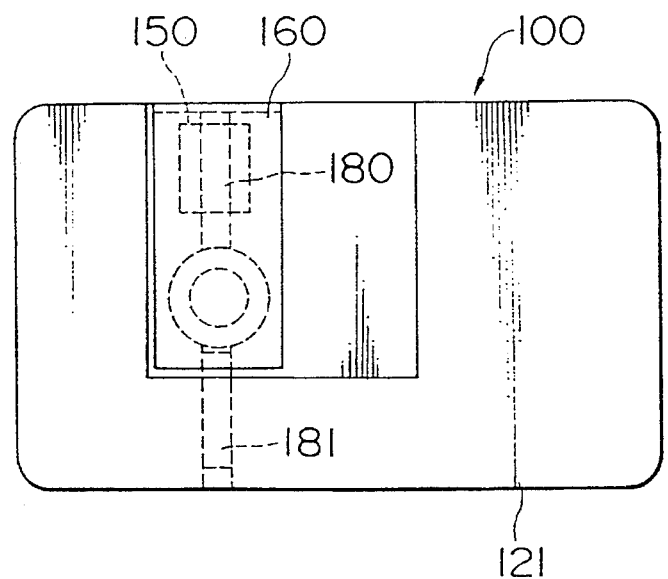
FIG. 41 is a plan view showing another embodiment of the optical disk-in-card.

FIG. 40A, FIG. 40B and FIG. 40C show an embodiment in which the optical disk memory is rotated by means of a magnet clamp. For further details, this embodiment is similar to that shown in FIG. 21A FIG. 41 shows an embodiment of the magneto-optical disk-in-card 100 best suited realizing the present invention. As shown in the figure, in the present magneto-optical disk-in-card 100, the optical disk medium 140 is incorporated in the protective case 120, 121 of a card size. Further, a window 150 is provided in the protective case for another incidence of light, and the optical disk is usually covered with a window cover 160. Here, when the optical disk-in-card 100 is set to the drive 200, the window cover 160 of the protective case is opened and light is made incident directly to the substrate of the optical disk, and a magnetic field generating means is used while allowing it to come near to the optical disk in the case of a magneto-optical disk. FIG. 42A and FIG. 42B show an external appearance of the optical disk-in-card 100 when the window cover 160 is opened. When the window cover 160 is opened, the optical disk 140 is exposed, and the optical head is able to make direct access to the optical disk.

FIG. 43A, FIG. 43B and FIG. 43C show in embodiment in which the optical disk memory of FIG. 23 is rotated by means of a magnet clamp. For further details, this embodiment is similar to that shown in FIG. 28A.

Another embodiment of the present invention will be described hereinafter with reference to the drawings.

Figure 44:
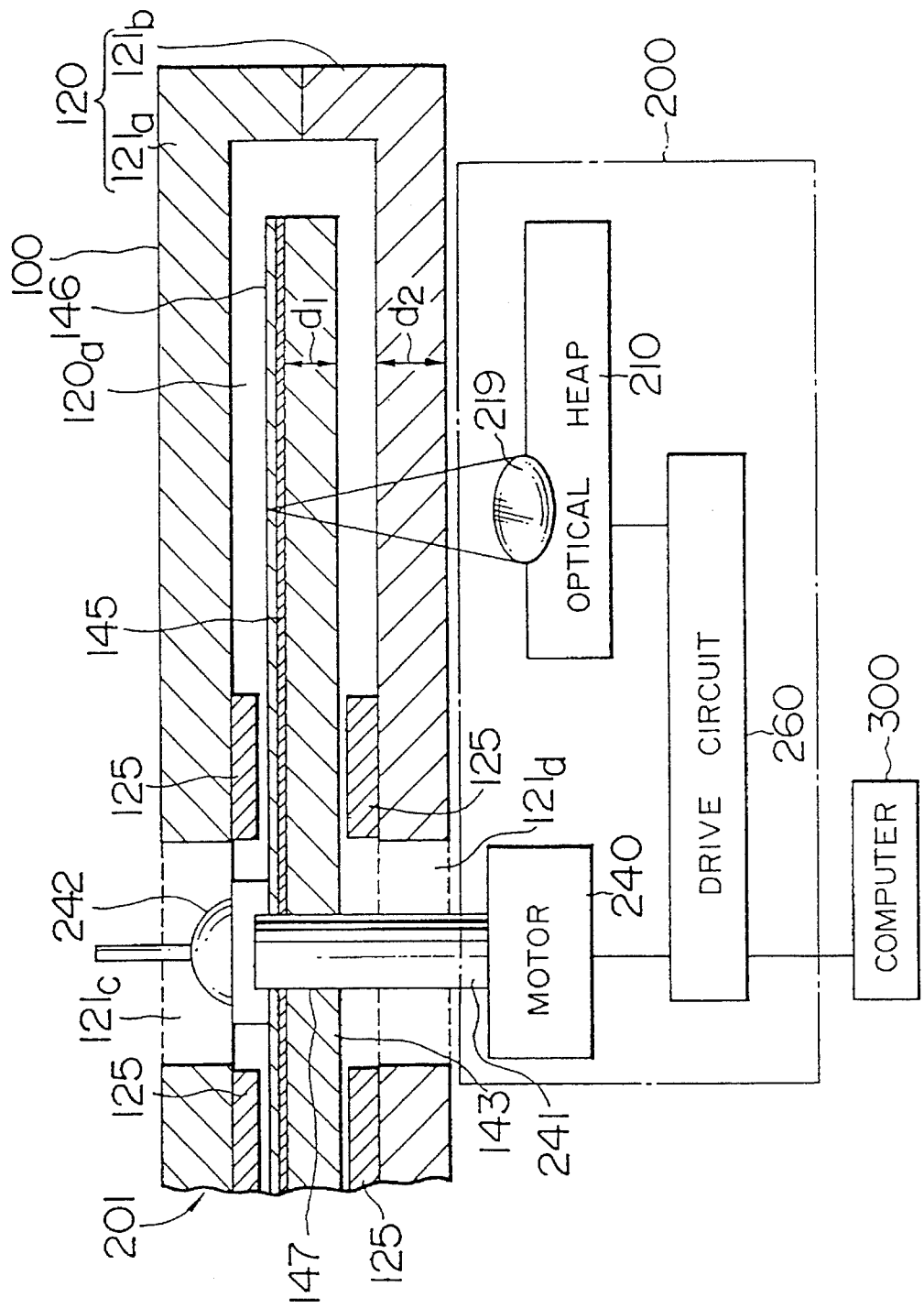
FIG. 44 is a sectional view of a principal part showing the construction of another embodiment of an optical disk memory unit and an embodiment of an optical disk drive unit according to the present invention.

FIG. 44 shows the outline of constructions of a first embodiment of an optical disk memory unit and an embodiment of an optical disk drive unit for recording, reproducing and erasing of information for the first embodiment according to the present invention.

An optical disk memory unit 100 in the present embodiment is composed of an optical disk 140 including a substrate 143 and a recording medium 145 for supporting the substrate 143, and a case 120 for containing and protecting the optical disk 140.

The optical disk 140 is formed similarly to a conventional optical disk except that the substrate 143 is thin.

It is possible to construct the substrate 143 with a material such as synthetic resin as acrylate, polycarbonate and epoxy, and glass and the like. This substrate 143 is formed in the thickness of 0.03 mm to 1.0 mm for instance. In the present embodiment, it is formed, for example, with a thickness of 0.5 mm.

A variety of types of recording mediums, such as a postscript type, a magneto-optical type, a phase change type and the like, for forming bits are used for the recording medium 145. A protective film 146 is formed on a top surface of the recording medium 145. A detailed example of the recording medium will be described later.

The case 120 is constructed by putting a set of case members 121a and 121b each having a thin tray form together and fixing them so as to form a space 120a inside thereof. It is possible to perform fixing by, for example, using an engagement means not shown or using adhesives, and further by combining both. The case member 121b is constructed of a transparent member. An appropriate member may be used for the transparent member which forms the case member 121b, but it is possible to use, for example, the material which forms the substrate 143. The same material as that of the substrate 143 of the contained optical disk 140 may be used, too. The thickness of the case member 121b is determined so as to satisfy the condition shown in the expression:

$$d1+d2<1.2 \text{ mm}$$

in case the refractive index of the case member 121b is equal to that of the substrate 143. Since the thickness d1 of the substrate 143 is at 0.5 mm as described above, it is only required that the thickness of the case member 121b be less than 0.8 mm. Here, it is determined to be 0.3 mm in order to reduce the thickness.

Openings 121c and 121d for chucking with a rotary shaft 241 of a motor 240 which will be described later are provided on the case members 121a and 121b, respectively, at a position which is a center of rotation of the optical disk. Further, dust preventive mats 125 are provided as pads around the openings 121c and 121d on inner surface sides of the case members 121a and 121b. This dust preventive mat 125 is provided in a ring form in the present embodiment. Further, the surface opposing to the optical disk 140 is provided so as to be close to the surface of the optical disk 140 to such an extent as to come almost in contact with the surface of the optical disk 140 in a state that there is no surface deflection. Naturally, it may be arranged so as to come in contact therewith practically. This dust preventive mat 125 may be constructed of the same material as that of a liner used in a flexible disk, for instance.

Figure 45A:
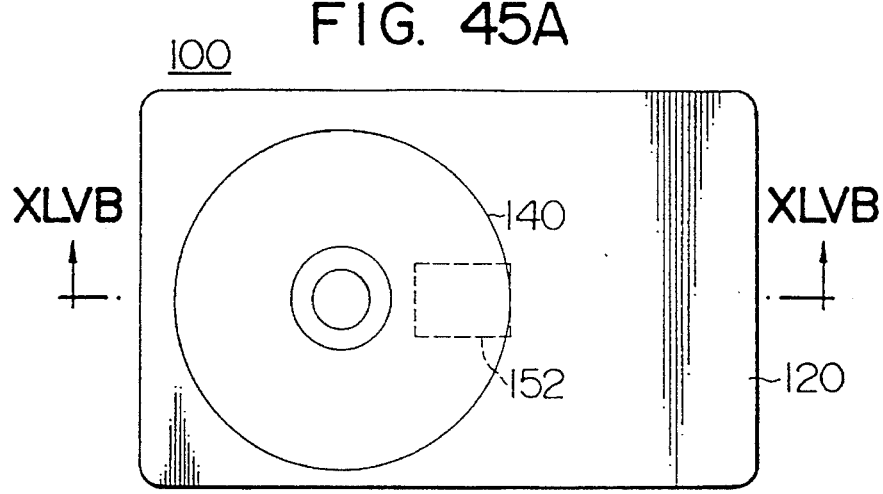
FIG. 45A and FIG. 45B are a plan view and a sectional view, respectively, showing an outline of the configuration of above-mentioned another embodiment of the optical disk memory unit.
Figure 45B:
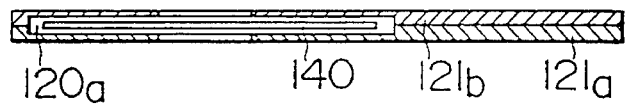

The case 120 may be formed in a planar card form similar to a credit card for instance. FIG. 45 shows an example of an optical disk memory unit 100 having such a card configuration. Namely, the optical disk 140 is contained in the case 120 as being of a card size in this example. Therefore, the optical disk memory unit 100 may be called an optical disk-in-card sometimes hereinafter. Besides, the case member 121b is a transparent body in the present invention, but only a light beam incident portion 152 shown with a broken line in the Figure may be constructed of a transparent plate, and other portions may be constructed to be opaque.

An optical disk drive unit 200 is composed of a motor 240 for rotating the optical disk 140, an optical head 210 and a drive circuit 260. The optical disk drive unit 200 itself functions as an information processor for performing processings such as recording, reproducing and erasing of information, but it is connected with a computer 300 and used as constituents of the information processing system.

Further, the optical disk drive unit 200 is provided with a mounting portion 201 for mounting the optical disk memory unit 100 at a part thereof. This mounting portion 201 is provided with a disk retainer 242 used for chucking the optical disk 140. This disk retainer 242 is supported in an evacuatable manner at a part not shown of the case of the optical disk drive unit 200. Further, it is also possible to perform chucking by providing magnets on the rotary shaft 241 and the disk substrate 143. In this case, the disk retainer 242 is no longer required.

Figure 46:
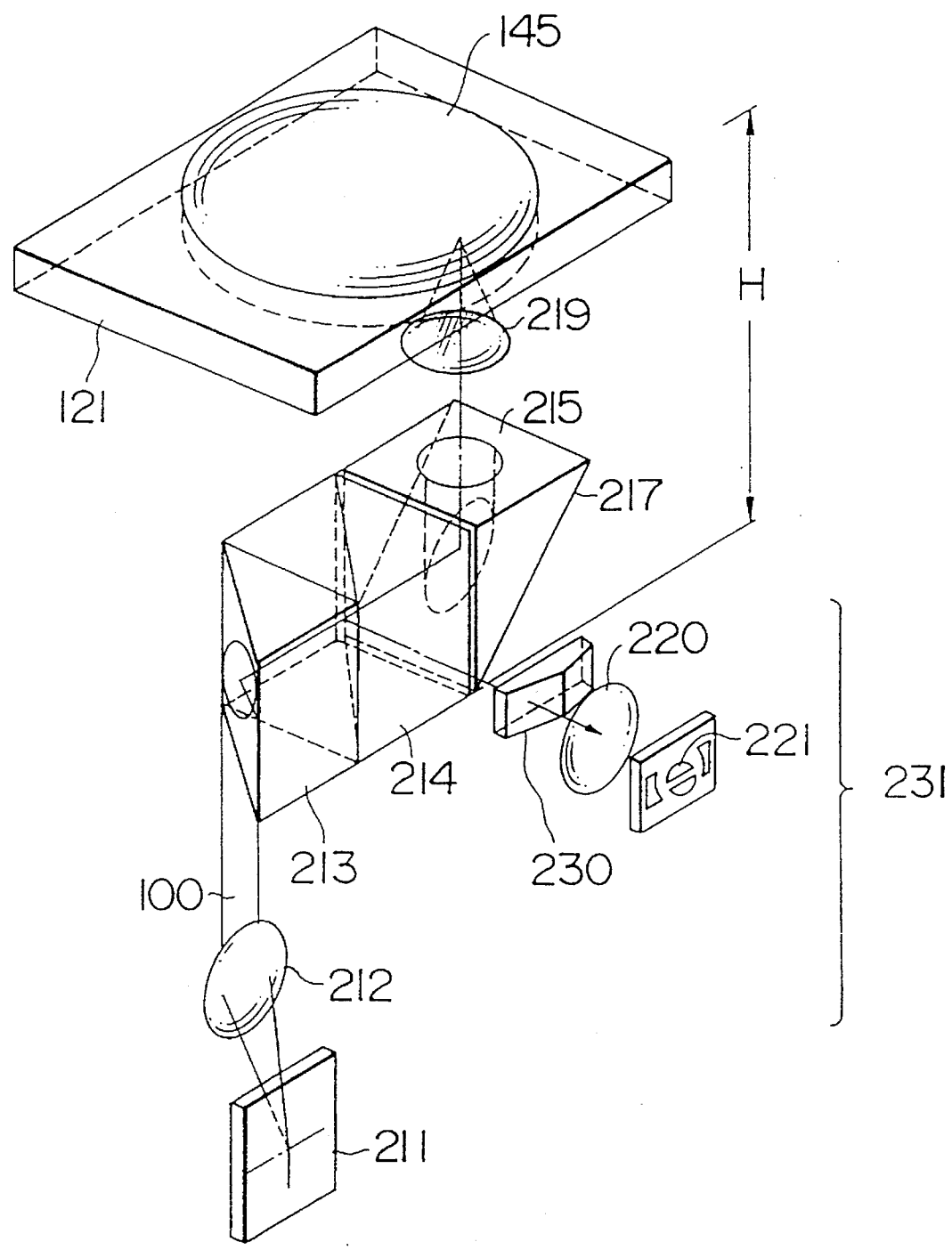
FIG. 46 is a perspective view showing another embodiment of an optical head preferred to recording/reproducing/erasing of information on an optical disk memory unit of the present invention.

It is preferable to adopt an optical head in which attention is paid to form a thin form as shown in FIG. 46 for the optical head 210.

This optical disk drive unit is contained in a computer cabinet which contains the optical disk drive unit inside thereof, but such a construction containing it in a case as shown in FIG. 1 may also be adopted.

Recording/reproducing/erasing of the optical disk is realized in the following manner with such a construction.

First, the optical disk memory unit 100 is mounted at the mounting portion 201 of the optical disk drive unit 200. At this time, the rotary shaft 241 of the motor 240 is inserted into the opening 121d of the case 120 of the optical disk memory unit 100, the tip of the rotary shaft 241 is made to penetrate through a through hole 147 at the center of the optical disk 140 and is fitted further to the disk retainer 242 which is inserted through the opening 121c at the tip thereof, thereby to fix the optical disk 140 to the rotary shaft 241. In this state, the motor 240 is able to rotate the optical disk 140 in accordance with the support from a drive circuit 260.

At the time of recording and erasing, new information is recorded on old information by modulating the power of a semiconductor laser contained in the optical head 210 between the erasing power and the recording power similarly to the manner shown in FIG. 13.

Further, at the time of reproducing, the power of a semiconductor laser is squeezed into comparatively small power and irradiation with the laser is made continuously, thereby to read the refractive index of the optical disk.

At the time of recording/reproducing/erasing, the recording medium 145 is irradiated with laser light through the transparent case member 121b and the substrate 143. Namely, according to such a construction, dust in the air will never stick to the substrate 143 and the recording medium 145, and dust may be limited oily to that from a rotation drive source of the optical disk. Further, since the plate thickness of the substrate 143 is selected at 0.5 mm, no problem is caused for recording/reproducing even if dust in the order of about 10 μm enters as compared with a case that no substrate is provided. Furthermore, it is possible to prevent dust from the openings 121c and 121d from entering by providing the dust preventive mats 125. Further, the dust preventive mat 125 performs cushioning duties when surface deflection occurs on the optical disk 100, and contributes to the stable rotation of the optical disk along with the disk retainer 242.

Incidentally, it is possible to use a conventional optical head as it is when the total thickness of the plate thickness d2 of the case member 121b of the case 120 and the plate thickness d1 of the substrate 143 is set to approximately 1.2 mm. However, when the total thickness is made less than 1.2 mm as in the present embodiment, it is possible to miniaturize the apparatus and reduce the thickness thereof. Accordingly, it becomes possible to make the optical disk thinner, and in turn, form the information processor, such as a lap-top computer, thinner.

FIG. 46 shows another embodiment of an optical head preferred to execute the present invention. In a conventional head, a shaping prism 213, a polarization beam splitter 214, a total reflection mirror 217 and a ¼ wave plate 215 have been manufactured with individual elements, respectively, but they are incorporated in one body so as to miniaturize the whole optical head in the present invention. Further, an optical detection system 231 is composed of a Foucault prism 230, a condenser lens 220 for detection and a detector 221.

Figure 47:
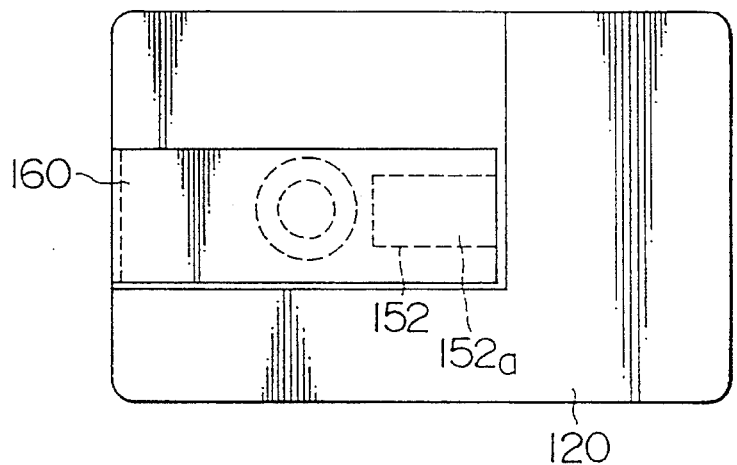
FIG. 47 is a plan view showing the construction of another embodiment of an optical disk-in-card of the present invention.

FIG. 47 shows another embodiment of the optical disk-in-card 100 for realizing the present invention.

In the basic construction, the case 120 is formed of an opaque material, a light incident portion 152 is provided and this portion is covered with a transparent protective case 152a. A feature of the embodiment shown in FIG. 12 lies in that a protective cover 160 is further provided.

Since the optical disk-in-card 100 of this type is carried freely, the card 120 is damaged sometimes. There is no problem even if parts other than the light incident portion are damaged, but the card case needs to be replaced sometimes if the light incident portion is damaged. It is an object of the present embodiment to reduce the frequency of card case replacement. Namely, the light incident portion is prevented from being damaged by providing the protective cover 160 on the case 120, and the protective cover 160 is opened when the optical disk-in-card 100 is inserted into the optical disk drive 200 so as to make light incidence free.

Figure 48:
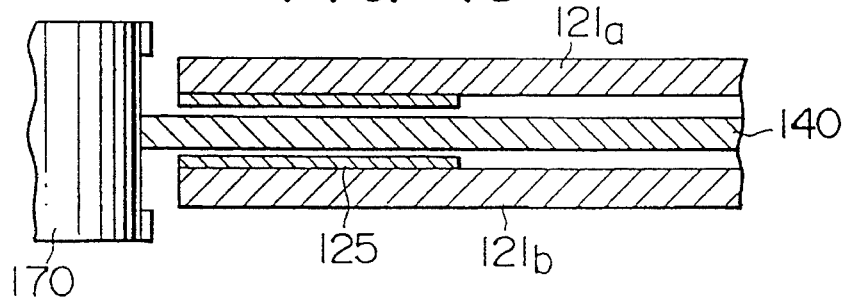
FIG. 48 is a sectional view of a principal part showing an example of an optical disk having recording media on both sides thereof.

FIG. 48 shows a construction example in case a reversible optical disk is used. As it is apparent from the Figure, it is possible to correspond easily to a reversible disk only due to the fact that both sides of the card are brought into an open state. In this case, transparent bodies are used for both case members 121a and 121b. Here, such a construction may be adopted whereby only the light incident portion is opened and a transparent protective plate is provided there.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An information processor comprising:
   a magneto-optical disk including a disk magneto-optical recording medium having a recording layer and an auxiliary recording layer formed on a transparent substrate for any of recording, reproducing and overwriting information based on optical modulation;
   a thin case, at least a light incident portion thereof being transparent, for housing said magneto-optical disk and rotatably supporting said disk magneto-optical recording medium, said thin case including magnetic field application means for initializing said auxiliary recording layer and magnetic field application means for recording information in said recording layer,
   wherein the total thickness of said transparent substrate and said thin case at the light incident portion is substantially 1.2 mm;
   an optical head for either of recording required information on said disk magneto-optical recording medium said reproducing information already recorded therein;
   rotation means for rotating said disk magneto-optical recording medium within said thin case;
   a drive circuit for controlling operation of said optical head and rotation speed of said rotation means;
   a processor for giving operation instructions to said drive circuit;
   input means for inputting information to said processor; and
   output means for outputting information from said processor.

2. An information processor, comprising:
   a magneto-optical disk-in-card including a rotatable disk magneto-optical recording medium composed of at least two layers, a recording layer and an auxiliary recording layer formed on a transparent substrate for any of recording, reproducing and overwriting information based on optical modulation;
   a card case for housing said magneto-optical disk-in-card being of a credit card size having a transparent light-incident portion, said card case including magnetic field application means for initializing said auxiliary recording layer, magnetic field application means for recording information in said recording layer, and rotation means for rotating said disk magneto-optical recording medium within said card case;
   wherein the total thickness of said transparent substrate and said card case at the transparent light-incident portion is substantially 1.2 mm;
   an optical head for reproducing information recorded in said disk magneto-optical recording medium;
   a drive circuit for controlling operation of said optical head and rotation speed of said rotation means;
   a processor for giving operation instructions to said drive circuit;
   input means for inputting information to said processor; and
   output means for outputting information from said processor.

3. A magneto-optical disk-in-card comprising:
   a rotatable magneto-optical disk recording medium composed of at least two layers, a recording layer and an auxiliary recording layer formed on a transparent substrate for any of recording, reproducing and overwriting information based on optical modulation;
   a card case for housing said rotatable magneto-optical disk recording medium, being of a credit card size, at least a light incident portion of which being transparent, said card case including magnetic field application means for initializing said auxiliary recording layer, magnetic field application means for recording information in said recording layer and rotation means for rotating said magneto-optical disk recording medium within said card case;
   wherein the total thickness of said transparent substrate and said card case at the light incident portion is substantially 1.2 mm.

4. A magneto-optical disk-in-card comprising:
   a rotatable magneto-optical disk recording medium composed of at least two layers, a recording layer and an auxiliary recording layer formed on a transparent substrate for any of recording, reproducing and overwriting information based on optical modulation;
   a card case for housing said rotatable magneto-optical disk recording medium, being of a credit card size, at least a light incident portion of which being transparent, said card case including magnetic field application means for initializing said auxiliary recording layer, magnetic field application means for recording information in the recording layer and rotation means for rotating said magneto-optical disk recording medium within said card case;
   wherein the total thickness of said transparent substrate and said card case at the light incident portion is approximately 1.2 mm, and said magneto-optical recording medium is a magneto-optical disk having a diameter of 48 to 54 mm and a recording capacity of at least 10 MB.

5. A magneto-optical disk-in-card comprising:
   a rotatable magneto-optical disk recording medium having a diameter size of any one of 12 inches, 8 inches, 5.25 inches, 5 inches and 3.5 inches, composed of at least two layers, a recording layer and an auxiliary recording layer formed on a transparent substrate for any of recording, reproducing and overwriting information based on optical modulation;
   a card case for housing said rotatable magneto-optical disk recording medium, at least a light incident portion of which being transparent, said card case including magnetic field application means for initializing said auxiliary recording layer, magnetic field application means for recording in said recording layer and rotation means for rotating said magneto-optical disk recording medium within said card case;

wherein the total thickness of said transparent substrate and said card case at the light incident portion is substantially 1.2 mm.

6. An information processor comprising:

an optical disk including an optical disk recording medium having a recording layer formed on a transparent substrate for either of recording and overwriting information with a change in a crystalline structure by irradiation with light; a transparent thin case for housing said optical disk including rotation means for rotatably supporting said optical recording medium and having at least a transparent light incident portion, wherein the total thickness of said transparent substrate and said thin case at the light incident portion is substantially 1.2 mm;

an optical head for either of recording required information in said disk optical recording medium and reproducing information already recorded therein;

a drive circuit for controlling operation of said optical head and rotation speed of said rotation means;

a processor for giving operation instructions to said drive circuit;

input means for inputting information to said processor; and output means for outputting information from the processor.

7. An optical disk-in-card comprising:

a rotatable optical disk recording medium having a recording layer formed on a transparent substrate for any of recording or overwriting information with a change in a crystalline structure by irradiation with light and reproducing information by irradiation with light;

a card case for housing said rotatable optical disk recording medium being of a credit card size, at least a light incident portion of which is transparent, said card case including rotation means for rotatably supporting said rotatable optical disk recording medium;

wherein the total thickness of the transparent substrate and the case at the light incident portion is at substantially 1.2 mm.

8. An optical disk-in-card comprising:

a rotatable optical disk recording medium having a recording layer formed on a transparent substrate for any of recording or overwriting information with a change in a crystalline structure by irradiation with light and reproducing information by irradiation with light;

a card case for housing said rotatable optical disk recording medium being of a credit card size, at least a light incident portion of which being transparent, said card case including rotation means for rotatably supporting said rotatable optical disk recording medium;

wherein the total thickness of said transparent substrate and said card case at the light incident portion is substantially 1.2 mm, and said recording medium is an optical disk having a diameter of 48 to 54 mm and a recording capacity of at least 10 MB.

9. An optical disk-in-card comprising:

a rotatable optical disk recording medium having a diameter size of any one of 12 inches, 8 inches, 5.25 inches, 5 inches and 3.5 inches including a recording layer formed on a transparent substrate for either of recording and overwriting information with a change in a crystalline structure by irradiation with light and reproducing information by irradiation with light;

a card case for housing said rotatable optical disk recording medium, at least a light incident portion of which being transparent said card case including rotation means for rotatably supporting said rotatable optical disk recording medium;

wherein the total thickness of the transparent substrate and the case at said light incident portion is at substantially 1.2 mm.

10. An information processor comprising:

an optical disk contained in a thin case including an optical disk recording medium formed on a transparent substrate for any of recording, reproducing and overwriting information based on optical modulation;

a thin case for housing said optical disk and including rotation means for rotatably supporting the optical disk recording medium, and dust protective mats for protecting dust from entering forcibly from a rotating portion, wherein at least a light incident portion of said case is transparent;

an optical head for any of recording required information in said optical recording medium, reproducing information already recorded therein, and overwriting information already recorded;

a drive circuit for controlling operation of said optical head and rotation speed of said rotation means;

a processor for giving operation instructions to said drive circuit;

input means for inputting information to said processor; and output means for outputting information from said processor.

11. An information processor comprising:

an optical disk including an optical disk recording medium formed on a transparent substrate for any of recording, reproducing and overwriting information based on optical modulation;

a thin case for housing said optical disk and including rotation means for rotatably supporting the optical disk recording medium, at least a light incident portion thereof being transparent, and in which the total thickness of said transparent substrate and said case at the light incident portion is 0.25 to 1.2 mm;

an optical head for any of recording required information in said optical recording medium, reproducing information already recorded therein, and overwriting information already recorded;

a drive circuit for controlling operation of said optical head and rotation speed of said rotation means;

a processor for giving an instruction to said drive circuit;

input means for inputting information to said processor; and output means for outputting information from said processor.

12. An information processor comprising:

a magneto-optical disk including a magneto-optical disk recording medium having a recording layer and an auxiliary recording layer formed on a transparent substrate for any of recording, reproducing and overwriting information based on optical modulation;

a thin case for housing said magneto-optical disk and including rotation means for rotatably supporting the magneto-optical disk recording medium, magnetic field application means for initializing said auxiliary recording layer and magnetic field application means for recording information in the recording layer provided in the case, wherein at least a light incident portion of said case is transparent and the total thickness of said transparent substrate and said case at the light incident portion is 0.25 to 1.2 mm;

an optical head for at least recording required information in said magneto-optical recording medium or reproducing information already recorded;

a drive circuit for controlling operation of said optical head and rotation speed of said rotation means;

a processor for giving operation instruction to said drive circuit;

input means for inputting information to said processor; and output means for outputting information from said processor.

13. An information processor comprising:

a magneto-optical disk-in-card including a rotatable magneto-optical disk recording medium composed of at least two layers, a recording layer and an auxiliary recording layer formed on a transparent substrate for any of recording, reproducing or overwriting information based on optical modulation;

a card case for housing said magneto-optical disk-in-card, being of a credit card size having a transparent light-incident portion, said card case including rotation means for rotating said magneto-optical disk recording medium, magnetic field application means for initializing said auxiliary recording layer and magnetic field application means for recording information in said recording layer, wherein the total thickness of said transparent substrate and said card case at the transparent portion is 0.25 to 1.2 mm;

an optical head for reproducing at least information recorded in said magneto-optical recording medium;

a drive circuit for controlling operation of the optical head and rotation speed of the rotation means;

a processor for giving an instruction to the drive circuit;

input means for inputting information to the processor; and output means for outputting information from the processor.

14. A magneto-optical disk-in-card comprising:

a rotatable magneto-optical disk recording medium composed of at least two layers, a recording layer and an auxiliary recording layer formed on a transparent substrate for any of recording, reproducing and overwriting information based on optical modulation;

a card case, being of a credit card size and at least light incident portion of which being transparent, for housing said magneto-optical disk recording medium, said card case including rotation means for rotating said magneto-optical disk recording medium, magnetic field application means for initializing said auxiliary recording layer magnetic field application means for recording information in said recording layer;

wherein the total thickness of said transparent substrate and said card case at the light incident portion is 0.25 to 1.2 mm.

15. A magneto-optical disk-in-card comprising:

a rotatable magneto-optical disk recording medium composed of at least two layers, a recording layer and an auxiliary recording layer formed on a transparent substrate for any of recording, reproducing and overwriting information based on optical modulation;

a card case, for housing said magneto-optical disk recording medium being of a credit card size, at least light incident portion of which being transparent, said card case including rotation means for rotating said magneto-optical disk recording medium, magnetic field application means for initializing said auxiliary recording layer and magnetic field application means for recording information in said recording layer incorporated in said card case;

wherein the total thickness of said transparent substrate and said card case at the light incident portion is 0.25 to 1.2 mm and said recording medium has a diameter of 48 to 54 mm and a recording capacity at least 10 MB.

16. A magneto-optical disk-in-card comprising:

a rotatable magneto-optical disk recording medium having a diameter size of any one of 12 inches, 8 inches, 5.25 inches, 5 inches and 3.5 inches, composed of at least two layers, a recording layer and an auxiliary recording layer formed on a transparent substrate for any of recording, reproducing and overwriting information based on optical modulation;

a card case for housing said magneto-optical disk recording medium, at least a light incident portion of which being transparent, said card case including rotation means for rotating said magneto-optical disk recording medium, magnetic field application means for initializing said auxiliary recording layer and magnetic field application means for recording information in said recording layer;

wherein the total thickness of said transparent substrate and said card case at the light incident portion is 0.25 to 1.2 mm.

17. An information processor comprising:

an optical disk including a magneto-optical disk recording medium having a recording layer formed on a transparent substrate for any of recording or overwriting information with a change in a crystalline structure by irradiation with light and for reproducing information by irradiation with light;

a thin case for housing said optical disk and including rotation means for rotatably supporting the disk magneto-optical recording medium, wherein at least a light incident portion of said case is transparent and the total thickness of said transparent substrate and said case at the light incident portion is 0.25 to 1.2 mm;

an optical head for any of recording required information in said optical recording medium, reproducing information already recorded therein;

a drive circuit for controlling operation of said optical head and rotation speed of said rotation means;

a processor for giving operation instructions to said drive circuit;

input means for inputting information to said processor;

and output means for outputting information from said processor.

18. An information processor comprising:

an optical disk-in-card including a rotatable optical disk recording medium having a recording layer formed on a transparent substrate for any of recording or overwriting information with a change in a crystalline structure by irradiation with light, and for reproducing information by irradiation with light;

a card case for housing said optical disk-in-card, being of a credit card size having a transparent light-incident portion, said card case including rotation means for rotating said optical recording medium;

wherein the total thickness of the transparent substrate and the case at the transparent portion is at 0.25 to 1.2 mm;

an optical head for reproducing at least information which is recorded in the optical recording medium;

a drive circuit for controlling operation of said optical head and rotation speed of said rotation means;

a processor for giving an instruction to said drive circuit;

input means for inputting information to said processor; and output means for outputting information from said processor.

19. An information processor comprising:

an optical disk-in-card including a rotatable disk optical recording medium having a recording layer formed on a transparent substrate for any of recording or overwriting information with a change in a crystalline structure by irradiation with light, and for reproducing information by irradiation with light;

a card case for housing said optical disk-in-card, being of a credit card size, at least a light incident portion thereof being transparent, said card case including rotation means for rotating the optical recording medium;

wherein the total thickness of said transparent substrate and said case at the light incident portion is 0.25 to 1.2 mm;

an optical head for reproducing at least information which is recorded in said optical recording medium;

a drive circuit for controlling operation of said optical head and rotation speed of said rotation means;

a processor for giving operating instructions to said drive circuit;

input means for inputting information to said processor; and output means for outputting information from said processor.

20. An optical disk-in-card comprising:

a rotatable optical disk recording medium having a recording layer formed on a transparent substrate for any of recording or overwriting information with a change in a crystalline structure by irradiation with light, or for reproducing information by irradiation with light;

a card case for housing said optical disk recording medium being of a credit card size, at least a light incident portion of which being transparent, said card case including rotation means for rotating said optical recording medium within said card case;

wherein the total thickness of said transparent substrate and said card case at the light incident portion is 0.25 to 1.2 mm.

21. An optical disk-in-card comprising:

a rotatable optical disk recording medium having a recording layer formed on a transparent substrate for any of recording or overwriting information with a change in a crystalline structure by irradiation with light, or for reproducing information by irradiation with light;

a card case for housing said optical disk recording medium being of a credit card size, at least a light incident portion of which being transparent, said card case including rotation means for rotating said optical disk recording medium;

wherein the total thickness of said transparent substrate and said card case at the light incident portion is 0.25 to 1.2 mm, and said recording medium is an optical disk having a diameter of 48 to 54 mm and a recording capacity of at least 10 MB.

22. An optical disk-in-card comprising:

an optical disk recording medium having a diameter size of any one of 12 inches, 8 inches, 5.25 inches, 5 inches and 3.5 inches including a recording layer formed on a transparent substrate for any of recording or overwriting information with a change in a crystalline structure by irradiation with light and reproducing information by irradiation with light;

a card case for housing said optical disk recording medium, at least a light incident portion of which being transparent said card case;

wherein the total thickness of the transparent substrate and the case at said light incident portion is at 0.25 to 1.2 mm.

23. An information processor comprising:

a magneto-optical disk including a magneto-optical disk recording medium having a recording layer and an auxiliary recording layer formed on a transparent substrate for any of recording, reproducing and overwriting information based on optical modulation;

a thin case for housing said magneto-optical disk and including rotation means for rotatably supporting the magneto-optical disk recording medium, magnetic field application means in a thin film form for initializing said auxiliary recording layer and magnetic field application means in a thin film form for recording information in said recording layer, at least a light-incident portion of said case being transparent, wherein the total thickness of said transparent substrate and said case at the light incident portion is 0.25 to 1.2 mm;

an optical head for either of recording required information in said magneto-optical disk recording medium or reproducing information already recorded therein;

a drive circuit for controlling operation of said optical head and rotation speed of said rotation means;

a processor for giving an instruction to said drive circuit;

input means for inputting information to said processor; and output means for outputting information from said processor.

* * * * *